US009658373B2

(12) United States Patent
Downing

(10) Patent No.: US 9,658,373 B2
(45) Date of Patent: May 23, 2017

(54) ANTI-COPY OPTICAL MATERIALS AND METHODS

(71) Applicant: 3DTL, Inc., Santa Clara, CA (US)

(72) Inventor: Elizabeth A. Downing, Los Altos Hills, CA (US)

(73) Assignee: 3DTL, Inc., Los Altos Hills, CA (US)

( * ) Notice: Subject to any disclaimer, the term of this patent is extended or adjusted under 35 U.S.C. 154(b) by 65 days.

(21) Appl. No.: 14/607,824

(22) Filed: Jan. 28, 2015

(65) Prior Publication Data

US 2015/0213349 A1    Jul. 30, 2015

Related U.S. Application Data

(60) Provisional application No. 61/932,707, filed on Jan. 28, 2014.

(51) Int. Cl.

| | | |
|---|---|---|
| *G06F 17/00* | (2006.01) | |
| *G02B 5/22* | (2006.01) | |
| *G06K 7/12* | (2006.01) | |
| *B42D 25/36* | (2014.01) | |
| *B42D 25/378* | (2014.01) | |
| *G07D 7/12* | (2016.01) | |
| *G07D 7/00* | (2016.01) | |
| *G07D 7/20* | (2016.01) | |
| *G06K 19/06* | (2006.01) | |

(52) U.S. Cl.
CPC ............. *G02B 5/223* (2013.01); *B42D 25/36* (2014.10); *B42D 25/378* (2014.10); *G06K 7/12* (2013.01); *G07D 7/0026* (2013.01); *G07D 7/121* (2013.01); *G07D 7/122* (2013.01); *G07D 7/2058* (2013.01); *G06K 2019/06225* (2013.01)

(58) Field of Classification Search
CPC ........... B41M 3/144; G06K 7/12; G06K 7/14; G06K 7/1404
USPC ................................ 235/375, 382, 439, 491
See application file for complete search history.

(56) References Cited

U.S. PATENT DOCUMENTS

| | | | | |
|---|---|---|---|---|
| 7,094,364 | B2 * | 8/2006 | Potyrailo | ............... B82Y 30/00 252/408.1 |
| 7,169,615 | B2 * | 1/2007 | Pai-Paranjape | .... G01N 21/6408 252/408.1 |
| 7,341,850 | B2 * | 3/2008 | Liu | .................. C07K 14/70567 435/69.1 |
| 8,110,281 | B2 | 2/2012 | Downing | |

* cited by examiner

*Primary Examiner* — Daniel St Cyr
(74) *Attorney, Agent, or Firm* — Blakely, Sokoloff, Taylor & Zafman LLP

(57) ABSTRACT

An anti-copy optical material and methods of using the material to passively frustrate scanner-based reproduction processes are disclosed. More particularly, embodiments of the anti-copy optical material include a fluorescent material to absorb visible incident light from a scan lamp and to emit a visible fluorescence. The anti-copy optical material may also include one or more optical absorbers to absorb one or more peak wavelengths of the visible incident light from the scan lamp.

23 Claims, 23 Drawing Sheets

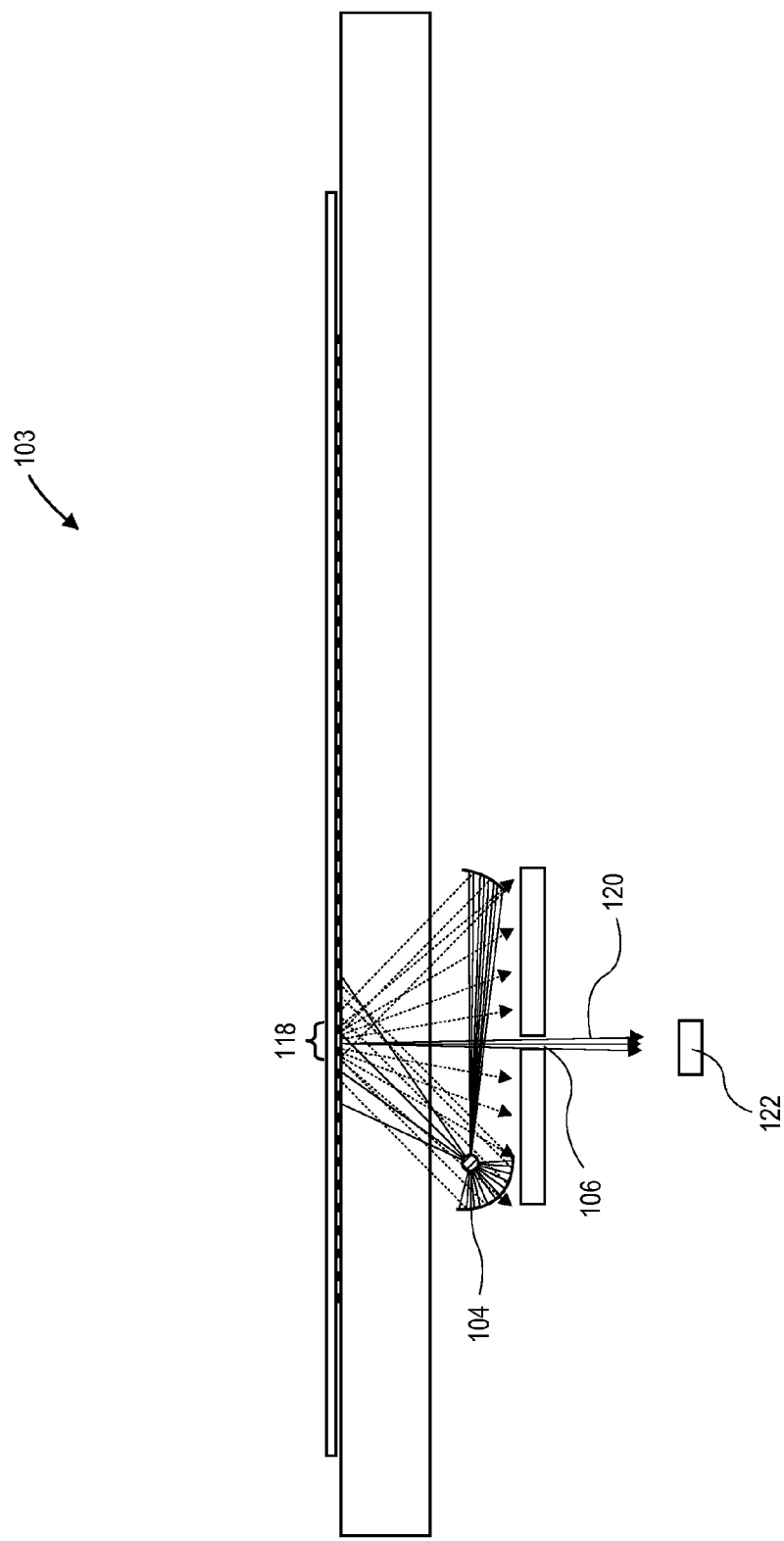

ANTI-COPY OPTICAL MATERIALS AND METHODS

This application claims the benefit of U.S. Provisional Patent Application No. 61/932,707, filed Jan. 28, 2014, and this application hereby incorporates herein by reference that provisional patent application.

BACKGROUND

Field

Anti-copy optical materials, particularly for use in anti-counterfeiting applications, are disclosed. More particularly, embodiments related to anti-copy optical materials incorporating fluorescent materials and one or more optical absorbers configured to absorb visible light, are disclosed.

Background Information

Advances in document reproduction technology over the past several decades have led to an increase in the illicit reproduction and counterfeiting of documents worldwide. Such documents include, but are not limited to: banknotes, government bonds, identity documents such as passports and driver's licenses, bank checks, bills of sale, deeds, and prescriptions for pharmaceuticals. The evolution of new reprographic technology has spawned a new class of "casual counterfeiters" with limited, if any, traditional counterfeiting skills. These counterfeiters take advantage of the increased availability of advanced color copiers and color scanner-computer-printer systems to counterfeit, e.g., banknotes that can be passed off as authentic currency.

One difficulty in stopping such illicit reproduction is that platen-based scanners readily copy most of the low-cost, level one, anti-counterfeiting features that exist on banknotes and other documents. These reprographic systems, like a human viewer, detect light in a visible spectrum that is diffusely reflected from a document surface, to capture an image of the document. Since both photocopier systems and humans detect light in the visible spectrum, it is difficult to create a feature on the document that will be imaged differently by a photocopier system, than how the feature will be seen under white light by a user.

Current anti-counterfeiting measures rely mainly on manufacturers to install firmware in scanners that can recognize predefined document images, e.g., images of specific banknotes, and in response, to disable the photocopy process. However, such scanners can be readily retrofitted with other software lacking the anti-counterfeiting restriction, thus rendering attempts to prevent illicit reproduction useless.

SUMMARY

Anti-copy optical materials, particularly for use in anti-counterfeiting applications, are disclosed. In an embodiment, an anti-copy optical material is provided having a fluorescent material and one or more optical absorbers. The fluorescent material may include a fluorophore, configured to absorb incident light having an excitation wavelength in a visible spectrum, and to emit light having a fluorescent wavelength in the visible spectrum. The incident light may include one or more peak wavelengths in the visible spectrum different from the excitation wavelength. The one or more optical absorbers may be configured to absorb substantially all of the incident light having the one or more peak wavelengths in the visible spectrum. For example, the optical absorbers may absorb more than about 50% of the incident light having the one or more peak wavelengths or provide at least about 1/e absorption of the incident light having the one or more peak wavelengths. The anti-copy optical material may also include a black binding medium that includes a binding medium refractive index. In an embodiment, the fluorescent material also includes a fluorescent material refractive index, and a difference between the binding medium refractive index and the fluorescent material refractive index is less than 5.

In an embodiment, the fluorescent material includes a shell surrounding the fluorophore. The shell may further surround a fluorescent dye in solution with a solvent. In an embodiment, the one or more optical absorbers include an optically absorptive pigment or an optically absorptive dye. The shell may surround at least one of the optically absorptive pigment or the optically absorptive dye.

In an embodiment, the visible spectrum includes an emission spectrum of a scan lamp, and the one or more peak wavelengths include one or more peak wavelengths in the emission spectrum. Also, an intensity of the fluorescent wavelength may be under a noise floor of the emission spectrum. In an embodiment, the excitation wavelength is in a blue color range of the visible spectrum, and the fluorescent wavelength is in a green color range of the visible spectrum.

In an embodiment, a medium is provided, such as a linear barcode or a matrix barcode printed or otherwise integrated on a substrate, and the medium is optically readable by a machine. The medium may include an anti-copy optical material on the substrate. The anti-copy optical material may include a fluorescent material and one or more optical absorbers. The fluorescent material may include a fluorophore configured to absorb incident light having an excitation wavelength in a visible spectrum and to emit light having a fluorescent wavelength in the visible spectrum. Furthermore, the incident light may include one or more peak wavelengths in the visible spectrum different from the excitation wavelength. The one or more optical absorbers may be configured to absorb substantially all of the incident light having the one or more peak wavelengths in the visible spectrum. In an embodiment, the fluorescent material includes a shell surrounding the fluorophore.

In an embodiment, a non-transitory machine-readable medium is provided having instructions which, when executed by a data processing system, causes the data processing system to perform a method. The method may include directing incident light toward a medium. The incident light may include one or more peak wavelengths in a visible spectrum and the medium may include an anti-copy optical material printed or otherwise integrated on a substrate. Further, the anti-copy optical material may include a fluorescent material having a fluorophore configured to absorb the incident light having an excitation wavelength in the visible spectrum and to emit light having a fluorescent wavelength in the visible spectrum. The anti-copy optical material may also include one or more optical absorbers configured to absorb substantially all of the incident light having the one or more peak wavelengths in the visible spectrum. The method may further include receiving returned light from the medium. The returned light may include the emitted light having the fluorescent wavelength. The method may further include authenticating the medium based on a relative intensity of the returned light having the fluorescent wavelength.

In an embodiment, the method also includes comparing the relative intensity of the returned light having the fluorescent wavelength to a relative intensity of the returned light having the one or more peak wavelengths. In an embodiment, the medium includes a barcode on the substrate, such as a linear or a matrix barcode. Authenticating the medium may include validating the barcode based on the relative intensity of the returned light having the emission wavelength being higher than the relative intensity of the returned light having the one or more peak wavelengths.

In an embodiment, a method is provided including generating light from a light source, such as on a tablet or a smartphone. The method further includes directing the light toward a barcode and capturing an image of the barcode while the barcode is illuminated by the light. The method may also include comparing the captured image to a stored barcode pattern, the stored barcode pattern representing an authentic version of the barcode when the authentic version is illuminated with light from a representative version of the light source. Furthermore, the method may include determining that the barcode is authentic when the captured image substantially matches the stored barcode pattern. The stored barcode pattern may not visually match the authentic version of the barcode when the authentic version of the barcode is viewed in ambient lighting, such as sunlight.

In an embodiment, the light source emits light having a predetermined set of peak wavelengths in a visible spectrum, and the barcode includes a fluorophore configured to be excited by an excitation wavelength, which may be different from the predetermined set of peak wavelengths, and to emit a fluorescence in the visible spectrum. Furthermore, the fluorescence from the fluorophore may alter the captured image such that the captured image does not visually match the authentic version of the barcode when the authentic version is viewed in the ambient lighting. In an embodiment, the barcode includes an optical absorber configured to absorb the light having the predetermined set of peak wavelengths in the visible spectrum.

BRIEF DESCRIPTION OF THE DRAWINGS

FIGS. 1A-1C are cross-sectional views of a portion of a photocopier during various stages of scanning a document.

DETAILED DESCRIPTION

Figure 1A:
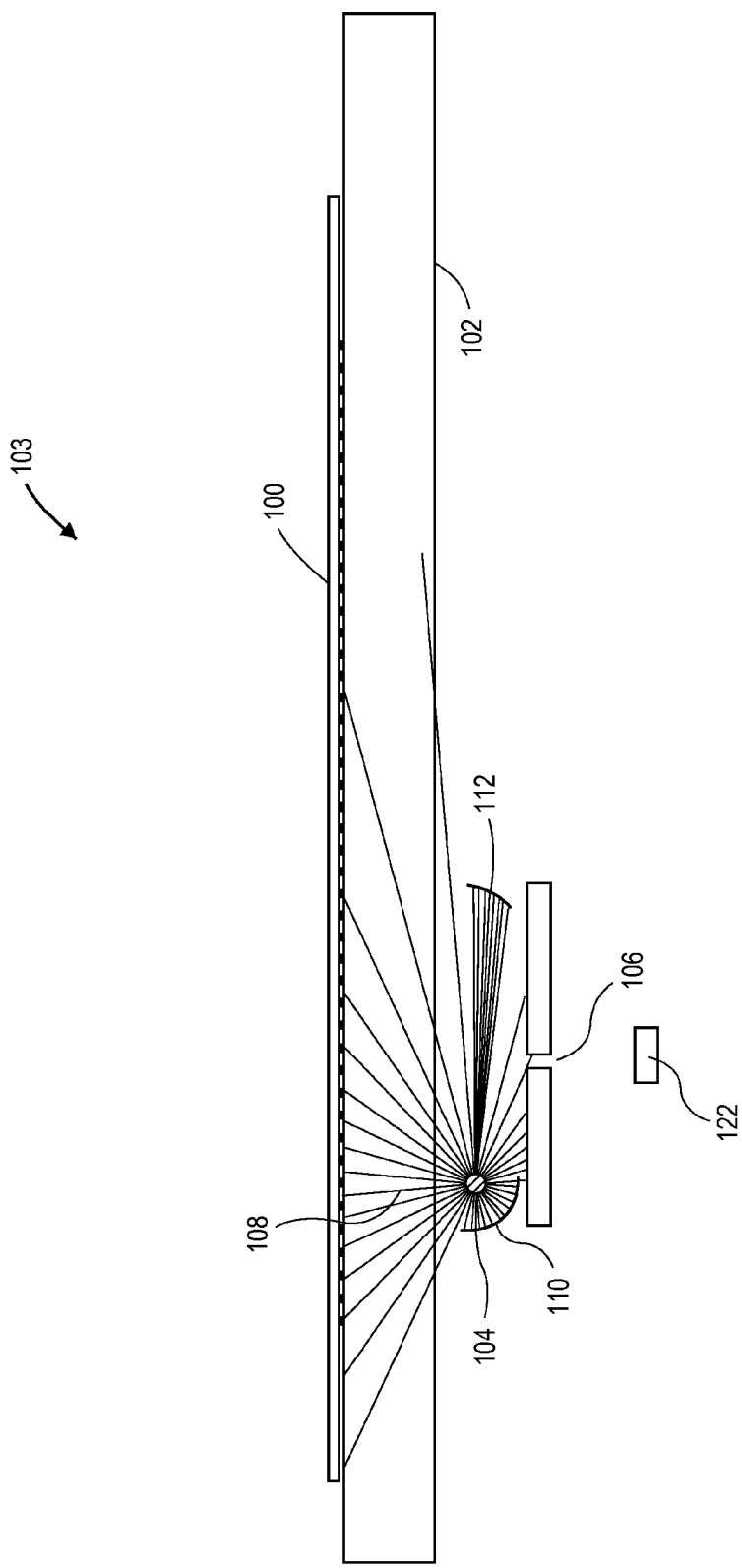

Embodiments describe anti-copy optical materials, particularly for use in anti-counterfeiting applications. However, while some embodiments are described with specific regard to frustrating attempts to make physical copies of documents, the embodiments are not so limited and certain embodiments may also be applicable to other uses. For example, anti-copy optical material may be incorporated onto an object to allow a scanning device or other equipment to detect the anti-copy optical material and validate the object as being authentic without the need to produce a physical copy or capture an image of the object.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment", or the like, means that a particular feature, structure, configuration, or characteristic described is included in at least one embodiment. Thus, the appearances of the phrase "one embodiment," "an embodiment", or the like, in various places throughout this specification are not necessarily referring to the same embodiment. Furthermore, the particular features, structures, configurations, or characteristics may be combined in any suitable manner in one or more embodiments.

In an aspect, embodiments describe anti-copy optical material that may be used to passively frustrate the photocopy process of typical scanners and photocopiers. The anti-copy optical material may be printed or otherwise integrated onto documents and into document features to frustrate the photocopy process in a manner that is independent of the firmware or optical configuration of the scanner or photocopier. In an embodiment, the anti-copy material causes the scanner to record a document image that is substantially different from an appearance of the document as seen by a human viewer, rendering a copy of the document unusable by someone trying to pass it off as legitimate.

In an aspect, an anti-copy optical material may be incorporated in features of a document to alter a spectrum of visible light that is returned to a detector array of a photocopier in response to a lamp illuminating a surface of the document with a high-intensity visible emission spectrum.

In an embodiment, an anti-copy optical material may include a fluorescent material configured to absorb visible light having an excitation wavelength and to emit visible light having a fluorescent wavelength such that short wavelength visible light directed toward the anti-copy optical material by the photocopier lamp may be absorbed and longer wavelength visible light may be fluoresced by the anti-copy optical material and captured by the detector array of the photocopier. Thus, the short wavelength visible light, which may have a low relative intensity in the incident light from the photocopier lamp, may be converted to longer wavelength visible light and returned to the photocopier detector array. As a result, the longer wavelength visible light may be reproduced as a corresponding color in a reprographic copy of the anti-copy optical material.

In an aspect, an anti-copy optical material may substantially absorb high-intensity light in a visible emission spectrum of a photocopier lamp illuminating a surface of the document such that reflection of the high-intensity light to the photocopier detector array is substantially reduced. In an embodiment, an anti-copy optical material may include one or more optical absorbers configured to absorb visible light having wavelengths that correspond to one or more peak wavelengths in an emission spectrum of the photocopier lamp. Thus, incident light directed by the photocopier toward the anti-copy optical material may be substantially absorbed at the specified wavelengths. As a result, when used in combination with the fluorescent material, a relative intensity of visible light fluoresced by the fluorescent material may be correspondingly higher in the light returned to a detector array of the photocopier. That is, fluoresced light that may be unnoticeable under ambient lighting and that may otherwise be submerged below a noise floor of the light signal returned to the detector array, may be detected, imaged, and recorded by the photocopier.

Figure 1B:
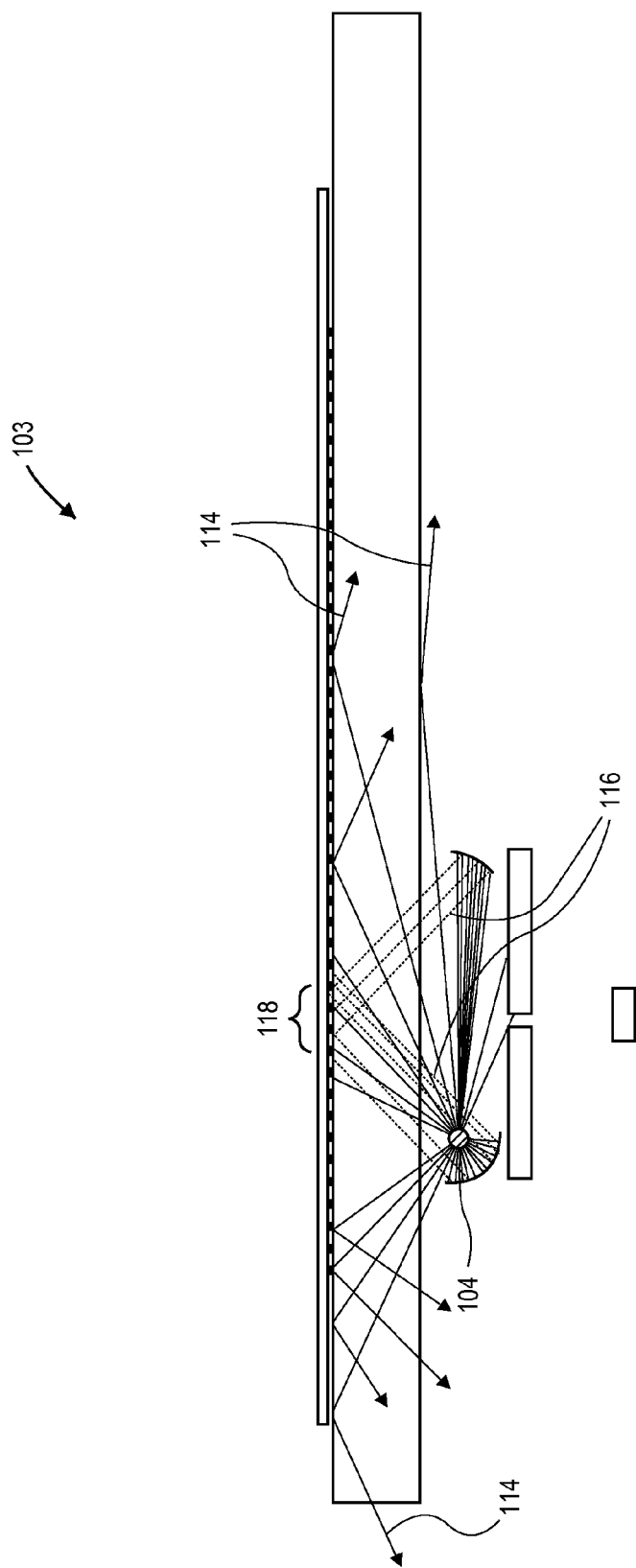

Referring to FIGS. 1A-1C, cross-sectional views of a portion of a photocopier during various stages of scanning a document are shown in accordance with an embodiment. A brief overview of the photocopying process is provided below to provide context for an embodiment in which an anti-copy optical material is used in an anti-counterfeiting application. However, it will be appreciated that the photocopier 103 and process described are representative, and that other reprographic or imaging technologies may be implemented in other applications.

Referring to FIG. 1A, the reproduction process employed by the vast majority of desktop scanners and photocopiers is based on digitally recording the diffuse reflection of high-intensity fluorescent light from the surface of a document 100 onto a one-dimensional detector array 122. In an embodiment, a document 100 to be copied is placed on a glass platen 102 of a photocopier 103, and a servo-controlled carriage that houses the illumination lamp 104, focusing/collection optics, slit input aperture 106, and a detector is moved beneath document 100 to acquire and store an image. In order to obtain high quality reproductions, very high-intensity bulbs are used in lamp 104, the diffuse reflection of which is then imaged through slit input aperture 106 to minimize aberrations. In order to record an entire document 100 through such a constrained optical system, the optics are moved across the surface of the document 100 and the image is acquired through a series of narrow slit scans. The slit scans are then compiled into an image data file.

Still referring to FIG. 1A, the document 100 may be placed with the information content facing down on glass platen 102. Lamp 104 emits light in a primary illumination pattern 108 before it reflects off of any surfaces. A first reflecting mirror 110 and a second reflecting mirror 112 collect, representing portions of the focusing/collection optics, collimate and direct as much of the lamp 104 energy as possible to a specific region of the document 100 where slices of information will be serially scanned.

Referring to FIG. 1B, photocopier 103 is shown after portions of primary illumination pattern has undergone a first reflection. In an embodiment, a substantial amount of light is reflected as unusable scattered light 114 into areas of the system where they cannot contribute to imaging the document 100. The low efficiency of light collection that results from the need to use narrow slit apertures to get aberration-free recordings drives the requirement for high-intensity lamps. Other light is reflected as an enhanced illumination pattern 116 that converges with some of the light from primary illumination pattern 108 at a strategic region on the document 100. This region, termed the intense illumination region 118, represents the area that all recorded slices of the scanned document 100 originate.

Referring to FIG. 1C, photocopier 103 is shown after illumination energy from lamp 104 has reflected from a copiable region of the document 118. The reflected light contains information that includes the lamp emission spectrum minus anything that has been absorbed by colored regions of document 100. A substantial amount of this reflected light is still unusable as it is ultimately reflected into areas that are outside of the collection path used for imaging, but a portion of the reflected light penetrates the slit input aperture 106 as imageable reflected light 120 that is collected by detector array 122 and imaged by the photocopier into a line scan. In some embodiments, imageable reflected light 120 may be reflected by one or more fold mirrors and pass through one or more focusing lenses prior to being collected by the detector array 122 for imaging and recording.

Figure 2:
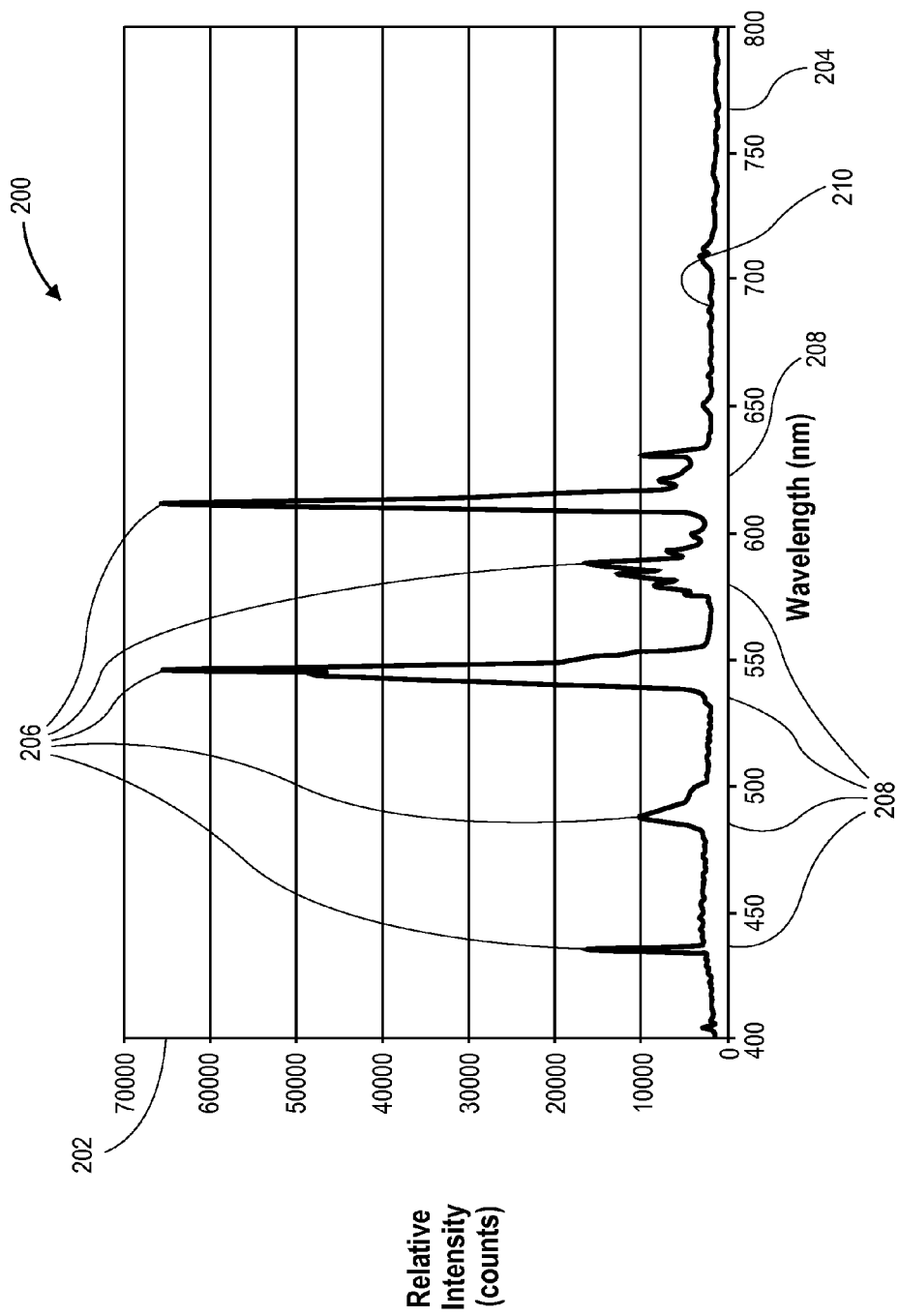
FIG. 2 is a graphical representation of an emission spectrum for a cold-cathode fluorescent illumination lamp in accordance with an embodiment.

Referring to FIG. 2, a graphical representation of an emission spectrum for a cold-cathode fluorescent (CCF) illumination lamp is shown in accordance with an embodiment. In an embodiment, lamp 104 of photocopier 103 includes a CCF illumination lamp. The emission spectrum of such lamps is well known and FIG. 2 provides a representative CCF lamp emission spectrum 200 for a typical commercial scanner or photocopier 103. The emission spectrum plots relative intensity of light rays on a y-axis 202 against a range of wavelengths on an x-axis 204. As shown, emission spectrum may include a visible spectrum. For purposes of this disclosure, a visible spectrum may encompass a range of wavelengths of light that is visible to a human eye. For example, a visible spectrum may span a range of about 380 nm to 750 nm. In other instances, the visible spectrum may be considered to span a narrower range, from about 390 nm to 700 nm.

Within the visible spectrum, the emission spectrum may include one or more peak intensities 206 for light having corresponding one or more peak wavelengths 208. More particularly, while emission spectra may vary from light source to light source, photocopier 103 lamps tend to emit spectra that are comprised of narrow peaks in the red, green, orange, yellow, violet, and blue color regions of the visible spectrum. For example, lamp 104 may emit light having peak intensities 206 at about 415 nm, 475 nm, 540 nm, 580 nm, 605 nm, and 680 nm. Accordingly, light emitted by lamp 104 may include spectra of relatively high-intensity light separated by spectra of relatively low-intensity light. The spectra having relatively low-intensity light may be used to define a noise floor 210. In an embodiment, noise floor 210 may include an average relative intensity of spectra having relatively low-intensity light. Alternatively, noise floor 210 may be predefined as a particular fraction of a selected peak intensity. For example, noise floor 210 may be predefined as being less than about 25% of the highest peak intensity, e.g., 0.25 a.u. More particularly, noise floor 210 may be predefined as being less than about 5% of the highest peak intensity, e.g., 0.05 a.u.

Figure 3:
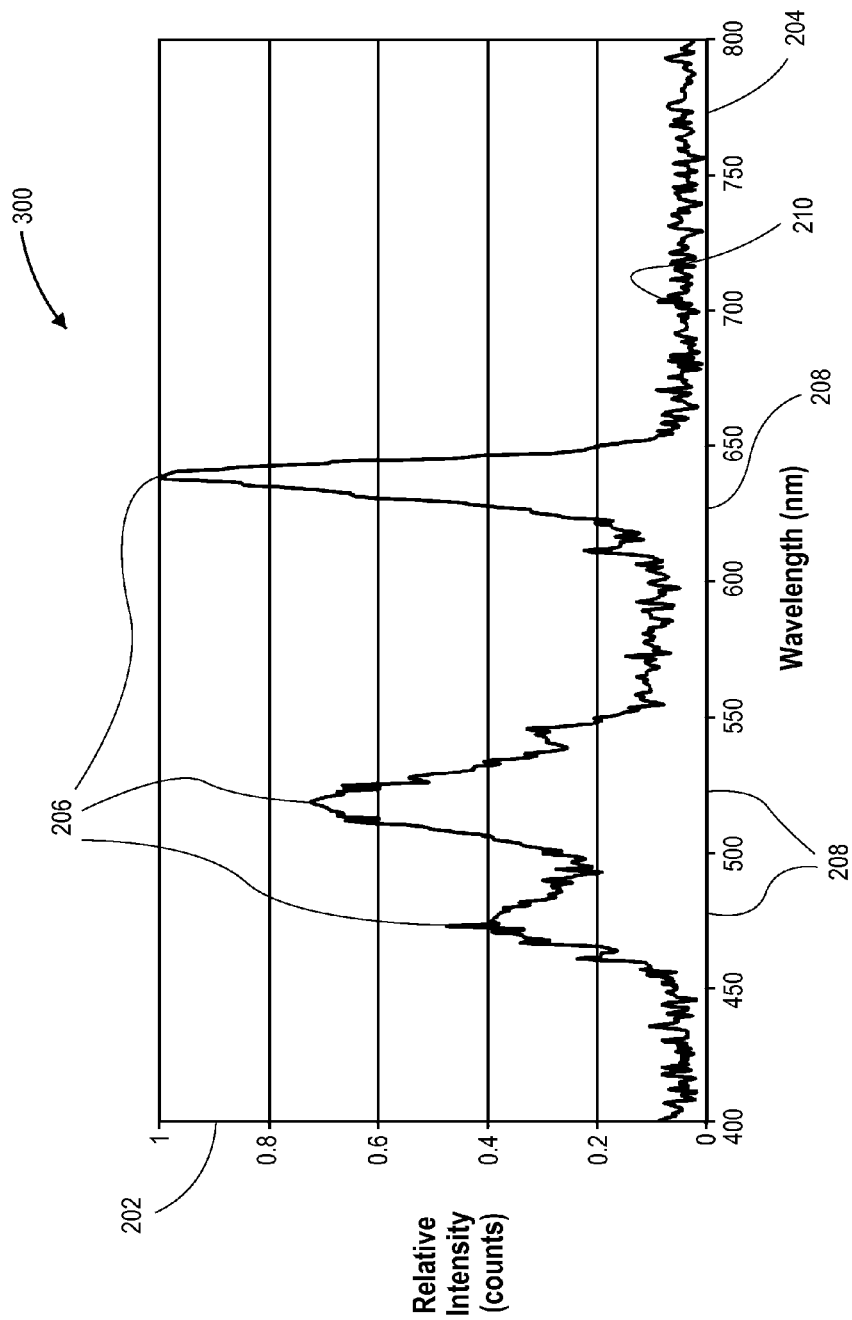
FIG. 3 is a graphical representation of an emission spectrum for a light-emitting diode illumination lamp in accordance with an embodiment.

Referring to FIG. 3, a graphical representation of an emission spectrum for a light-emitting diode (LED) illumination lamp is shown in accordance with an embodiment. In an embodiment, lamp 104 of photocopier 103 includes an LED illumination lamp 104. The emission spectrum of such lamps is well known, and FIG. 3 provides a representative LED lamp emission spectrum 300 for a typical commercial scanner or photocopier 103. The emission spectrum plots relative intensity of light rays on a y-axis 202 against a range of wavelengths on an x-axis 204. In an embodiment, peak intensities 206 of the emission spectrum differ from peak intensities 206 of CCF illumination lamps. For example, peak intensities 206 may occur at one or more peak wavelengths 208 of about 470 nm, 530 nm, and 640 nm corresponding to blue, green, and red color ranges of the visible spectrum. Nonetheless, although emission spectra may vary for different illumination lamp types, different lamp types tend to emit light in distinct spectral ranges having corresponding peak wavelengths 208 in the visible spectrum. Not only are the peak wavelengths 208 within the visible spectrum, but even if lamp 104 did emit, e.g., UV or IR light, the platen 102 is typically made of glass, which blocks UV light from transmitting toward document 100. The use of only visible light to reproduce copied documents may further complicate the anti-copy objective, as virtually no UV or IR components are available in the lamp 104 emission spectrum to generate fluorescence in accordance with some of the embodiments described below. Furthermore, even if non-visible wavelengths could be used to create fluorescence, the amount of such fluorescence would be very small relative to the scan lamp 104 energy and would be lost below a noise floor 210 of the reflected signal.

In an embodiment, an anti-copy optical material may be incorporated in features of document 100 to alter a spectrum of light that is returned to detector array 122 of photocopier 103 in response to lamp 104 illuminating a surface of document 100 with an emission spectrum, such as CCF lamp emission spectrum 200 or LED lamp emission spectrum 300. The anti-copy optical material may also incorporate optical absorbers in features of document 100 to allow for a fluorescence included in the spectrum of light that is returned to the detector array 122 to exhibit an intensity above a noise floor 210 of the returned signal, such that the fluorescence may be detected, imaged, and recorded.

Figure 4:
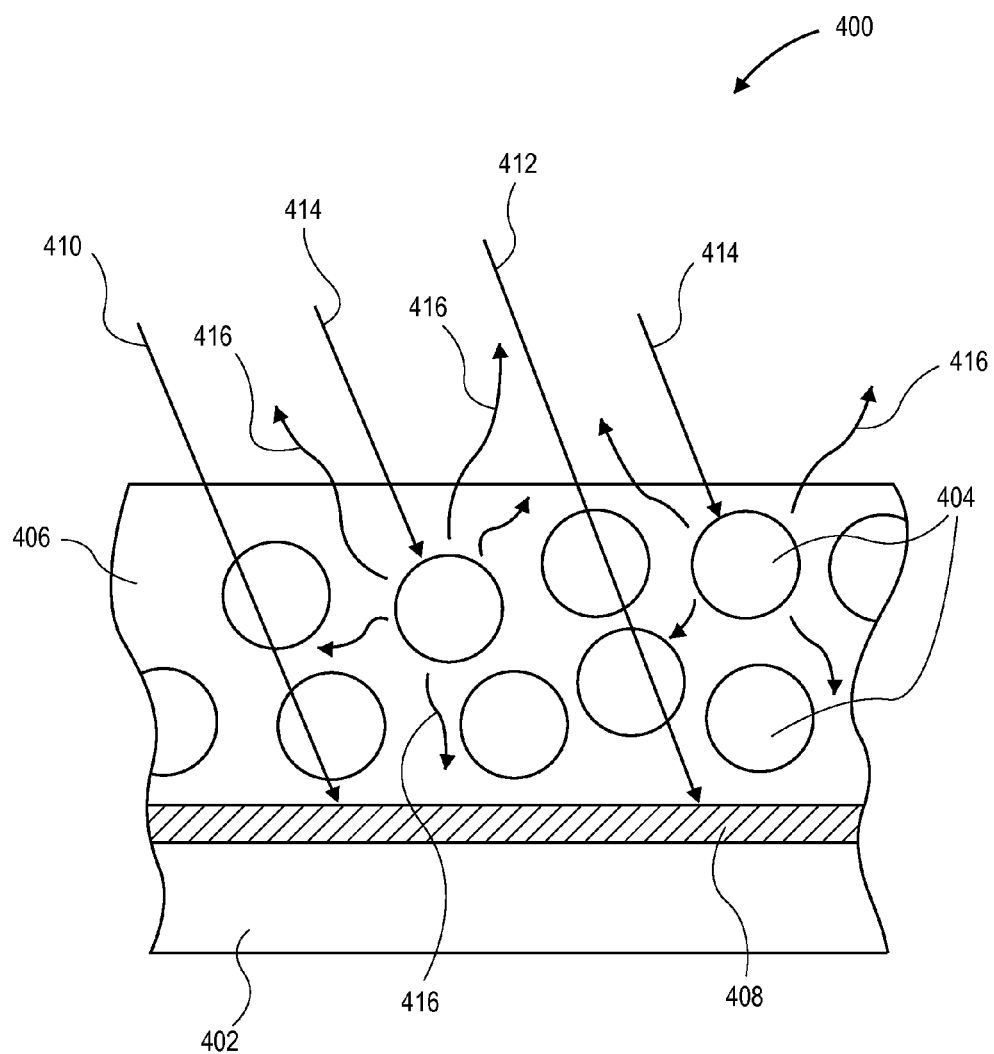
FIG. 4 is a partial cross-sectional view of an anti-copy optical material fluorescing under incident light in accordance with an embodiment.

Referring to FIG. 4, a partial cross-sectional view of an anti-copy optical material fluorescing under incident light is shown in accordance with an embodiment. In an embodiment, document 100 may include an anti-copy optical material 400 printed, coated, or otherwise integrated on a substrate 402, e.g., paper, plastic film, etc. Anti-copy optical material 400 may include a fluorescent material 404, such as a fluorescent dye, a fluorescent pigment, or a fluorescent particle. More particularly, fluorescent material 404 may include a fluorophore capable of re-emitting visible light upon excitation by visible light. Furthermore, fluorescent material 404 may be incorporated or integrated within a binding medium 406. Binding medium 406 may include, for example, an ink that binds and suspends fluorescent material 404 above a base layer 408. In an embodiment, base layer 408 may include an optical absorber, such as a colored underprint, e.g., black ink, printed over substrate 402.

Still referring to FIG. 4, incident light emitted by lamp 104 in primary illumination pattern 108 and enhanced illumination pattern 116 may be represented by an emission spectrum, such as CCF lamp emission spectrum 200 or LED lamp emission spectrum 300, which includes a visible spectrum. The visible spectrum may further include light having a first peak wavelength 410, light having a second peak wavelength 412, and light having an excitation wavelength 414. More particularly, first peak wavelength 410 and second peak wavelength 412 may correspond to one or more of peak wavelengths 208 in the emission spectrum, e.g., corresponding to red and green color ranges. Excitation wavelength 414 may also correspond to a peak wavelength in the emission spectrum, e.g., corresponding to a blue color range, although such correspondence is not necessary. More particularly, in an embodiment, excitation wavelength 414 may correspond to a wavelength in the emission spectrum that is under noise floor 210, or at least which does not correspond to the one or more of peak wavelengths 208 or one or more spectra of relatively high-intensity light.

In an embodiment, fluorescent material 404 is configured to absorb light having excitation wavelength 414, and in response, to emit a fluorescence 416. For example, fluorescent material 404 may have an absorption maxima centered on a blue scan lamp emission line and be configured to emit Stokes' fluorescence with a maxima centered roughly between the green (543 nm) and the yellow (592 nm) peak wavelengths 208, e.g., at a fluorescence wavelength of about 570 nm. In an embodiment, fluorescent material 404 may absorb an amount of scan lamp energy at the absorption maxima on the order of about $1 \times 10^{-9}\%$ up to about 100%. Thus, in an embodiment, the absorption maxima of fluorescent material 404 does not substantially overlap any of the one or more peak spectra of the lamp emission spectrum and/or the fluorescence does not correspond to any of the one or more peak spectra. Some fluorescence 416 may transmit away from substrate 402 and propagate as imageable reflected light 120 along an optical path to detector array 122 for imaging.

In an embodiment, base layer 408 provides an optical absorber configured to absorb at least some of the incident light having the one or more peak wavelengths 208. For example, base layer 408 may include colorants, such as pigments or dyes, which effectively absorb high-intensity spectra of the emission spectrum. The colorant may be black, e.g., carbon black pigment, which provides for absorption of all wavelengths. Thus, light having first peak wavelength 410 and second peak wavelength 412 may have long wavelengths that transmit through fluorescent material 404 and binding medium 406, which may not be particularly well-suited to absorption of such wavelengths, and may instead be absorbed by base layer 408. In an embodiment, base layer 408 may be engineered to absorb substantially all, e.g., 1/e absorption, of incident visible light having a predetermined narrow of broad spectrum. Although base layer 408 may also absorb fluorescence 416, enough fluorescence 416 may emit away from base layer 408 to be collected by detector array 122 and photocopied as a visible color.

In an embodiment, optical absorbers of anti-copy optical material 400 may include optically absorptive pigments and dyes that exhibit fluorescence. For example, optically absorptive pigments and dyes may be configured to absorb light having one or more peak wavelengths 208 of the lamp emission spectrum and to emit fluorescence at longer wavelengths, e.g., in the infrared range. Thus, although light may be emitted from optical absorbers back toward detector array 122, the emitted light may be in a non-visible spectrum such that it passes undetected and/or is not reproduced as a color in a photocopy. Accordingly, the light fluoresced from an optical absorber may not overwhelm light fluoresced from fluorescent material 404 in a return signal.

In an embodiment, binding medium 406 includes colorants that absorb certain wavelengths of incident light. For example, binding medium 406 may be a blackish or otherwise colored ink that absorbs a broad spectrum of light wavelengths or a narrow band of light wavelengths. Binding medium 406 may also transmit a broad spectrum of light wavelengths or a narrow band of light wavelengths. Thus, binding medium 406 may be a chosen color of ink with the desired transmission characteristics that will permit sufficient visible light to be absorbed by anti-copy optical material in order to make the printed area appear very dark, and yet will not prevent the emission of fluorescent light along an optical path toward detector array 122.

Figure 5A:
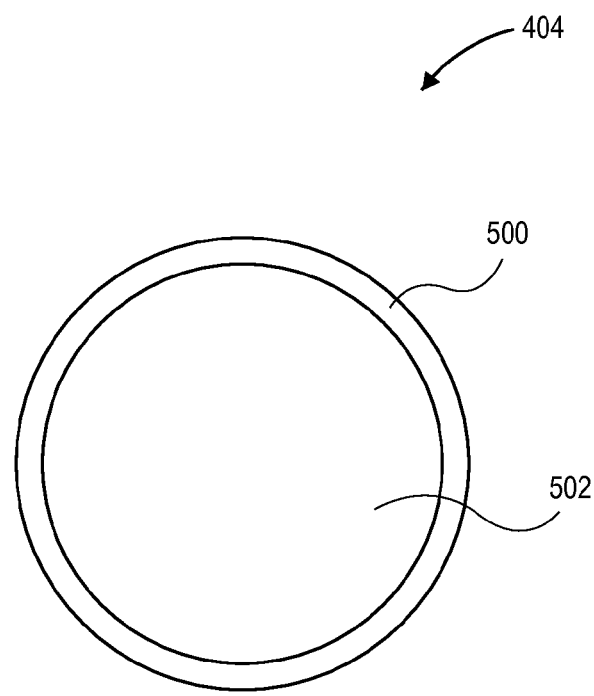
FIG. 5A-5C are cross-sectional views of a fluorescent material in accordance with various embodiments.

Referring to FIG. 5A, a cross-sectional view of a fluorescent material is shown in accordance with an embodiment. Fluorescent material 404 may be embodied by numerous configurations that exhibit the characteristic of absorbing visible light from lamp 104 of photocopier 103 and emitting visible light back to detector array 122 of photocopier 103. In an embodiment, fluorescent material 404 includes a shell 500 surrounding a fluorophore 502. Shell 500 may be formed from a material used in the art of microencapsulation. For example, shell 500 may include thermosetting resins or polymers, proteins, or gelatins. Numerous methods may be employed to encapsulate fluorophore 502 within shell 500, including known methods such as known physical, physico-chemical, and chemical methods. Examples of suitable materials for forming shell using such methods include: alginate-chitosan, cellulose, collodian nitrocellulose, ethyl cellulose, gelatin, gelatin-gum arabic, melamine formaldehyde, mealamine urea-form-aldehyde, nylon, phenol formeldahyde, polyacrylonitrile, polyamide, polyanhydrides, polyelectrolyte complex, polyethylene, polyethylene glycol, poly-L-lysine, polylactic acid, polylysine alginate, polynucleotides, polypetides, polyphosphazene, polypropylene, polysaccharides, polystyrene, and urea-formaldehyde, to name a few.

Depending upon the encapsulation method used, fluorescent material 404 may have a generally spherical shape, or it may be differently shaped. For example, fluorescent material 404 having shell 500 may have a cubic, polygonal, or ellipsoidal structure. An outside dimension of fluorescent material 404 may be in a range of between about 10 nm to 10 mm. More particularly, fluorescent material 404 may have an outside dimension of between about 100 nm to 100 μm. For example, an outside dimension of fluorescent material 404 may be about 3 μm. One skilled in the art will recognize that fluorescent material 404 may be sized and shaped in a wide range of configurations at least because anti-copy optical material 400 may not only be printed on substrate 402, but may also be embedded in an ancillary object, e.g., a plastic film, and then applied over substrate 402. Accordingly, the physical morphology of anti-copy optical material 400 constituents may vary depending on the target application.

Shell 500 may also be formed with varying shapes and thicknesses. For example, shell 500 may be spherical or otherwise shaped. An average thickness of shell 500 may be between about 1 picometer to 1 meter, depending on the application. In an embodiment, shell 500 includes an average thickness of between about 100 nm to 1 μm.

Fluorophore 502 may be incorporated in a fluorescent dye having one or more absorption peaks centered in the visible spectrum. More particularly, fluorescent material 404 may include a fluorescent dye configured to be excited by one or more excitation wavelength 414. Similarly, the fluorescent dye may be configured to emit fluorescence having one or more corresponding fluorescence wavelength. Fluorescent dye may further be combined with an appropriate solvent to form a solution that is encapsulated by shell 500. As an example of a suitable solution, fluorescent dye may include Rhodamine 6G in a 50% saturated solution with one or more of ethanol, methanol, or acetone. Table 1 below provides a listing of other suitable fluorescent dyes that are commercially available and that may be combined with an appropriate solvent to form a fluorescent solution, as well as a corresponding excitation wavelength 414 and fluorescence wavelength of the resulting fluorescent material 404.

TABLE 1

Fluorescent Dyes and Corresponding Excitation and Fluorescence Wavelengths

| Fluorescent Dye | Excitation Wavelength | Fluorescence Wavelength |
| --- | --- | --- |
| Alexa Fluor 546 | 554, 515 | 574 |
| Alexa Fluor 555 | 552, 520 | 599, 567 |
| ATTO 425 | 436 | 484 |
| ATTO 465 | 453 | 507 |
| ATTO 488 | 500 | 525 |
| ATTO 495 | 495 | 527 |
| ATTO 514 | 511 | 533 |
| ATTO 520 | 524, 345 | 545 |
| ATTO 532 | 533 | 553 |
| ATTO 550 | 553, 358 | 576 |
| ATTO 565 | 563, 364 | 592 |
| ATTO Rho3B | 566 | 593 |
| ATTO Rho6G | 535 | 560 |
| ATTO Thio12 | 579 | 606 |
| Catskill Green 540 | 482 | 540 |
| Courmarin 545 | 480 | 519 |
| DY-555 | 546, 356, 307 | 570 |
| DY-680 | 691, 476, 369 | 709 |
| DY-681 | 691, 477, 369 | 709 |
| FluoSpheres Orange | 540 | 559 |
| FluoSpheres Red | 576 | 607 |
| FluoSpheres Yellow-Green | 503, 357 | 514 |
| Fort Orange 600 | 581, 554, 482 | 600 |
| HiLyte Plus 555 | 552 | 567 |
| HiLyte Plus 647 | 577 | 668 |
| Hops Yellow 560 | 545 | 560 |
| Lake Placid 490 | 490 | 490 |
| PromoFluor-488 | 494 | 521 |
| Pyrromethene 546 | 493 | 519 |
| Sulforhodamine G | 533, 347 | 551 |

The listing of fluorescent dyes in Table 1 is provided as a non-limiting example, and one skilled in the art will recognize that other fluorescent dyes may be used and combined with appropriate solvents in accordance with this disclosure. For example, some of the fluorescent dyes above, or other fluorescent dyes, may be placed in solution with solvents, including polar and non-polar solvents, such as: acetic acid, acetone, acetronitrile, benzene, buffer, chloroform, cyclopentane, cyclohexane, dichloromethane, diethyl ether, dimethylformamide, dimethyl sulfoxide, 1,4-dioxane, ethanol, ethyl acetate, formic acid, hexane, isopropanol, methanol, propylene carbonate, n-butanol, nitromethane, n-propanol, pentane, tetrahydrofuran, toluene, and water. Similarly, any of the solvents listed above may be combined with fluorescent dyes not specifically provided in Table 1. One skilled in the art of will understand that the choice of fluorescent dye and solvent combinations may be made to render an adequate solution, and that the adequacy of such solution may depend not only on intrinsic factors such as solubility, but also on factors such as compatibility with the chosen microencapsulation materials and methods. The microencapsulation materials and methods may be known in the art, and thus, a suitable combination of fluorescent dyes, solvents, and shell materials may be chosen by one skilled in the art. Accordingly, neither Table 1 nor any of the listings of dyes, solvents, and microencapsulation materials provided herein shall be interpreted to limit the breadth of embodiments contemplated to be within the scope of this disclosure.

Figure 5B:
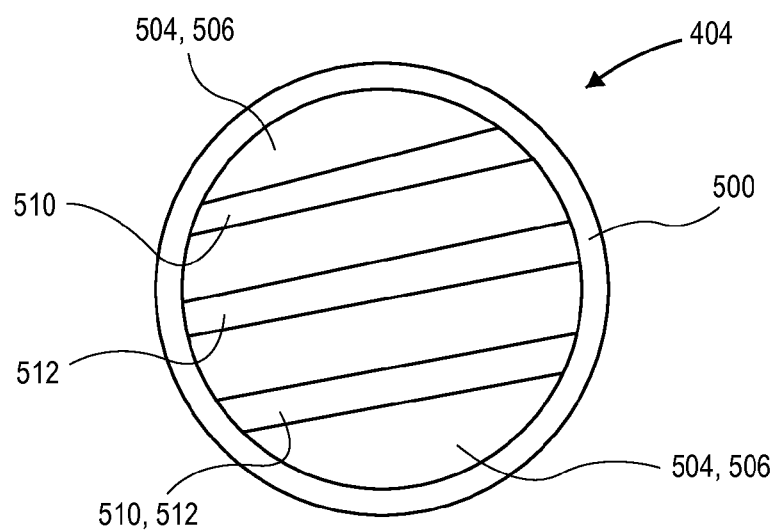

Referring to FIG. 5B, a cross-sectional view of a fluorescent material is shown in accordance with an embodiment. In an embodiment, anti-copy optical material includes one or more optical absorbers integrated within fluorescent material 404. For example, one or more optical absorbers may be encapsulated within shell 500. In this system a fluorescent dye 504 in solution with a solvent 506 and a first optically absorptive dye 510 is suspended or dissolved within the fluorescent solution. First optically absorptive dye 510 may include, for example, a black dye or a selective color absorbing dye. For example, first optically absorptive dye 510 may be configured to selectively absorb incident light having one or more of peak wavelengths 208, e.g., corresponding to a green color spectrum. In an embodiment, a second optically absorptive dye 512 may be incorporated within anti-copy optical material, and more particularly, encapsulated within shell 500. Second optically absorptive dye 512 may be configured to selectively absorb incident light having a different peak wavelength than light absorbed by first optically absorptive dye 510. For example, second optically absorptive dye 512 may selectively absorb incident light corresponding to a red color spectrum.

Figure 5C:
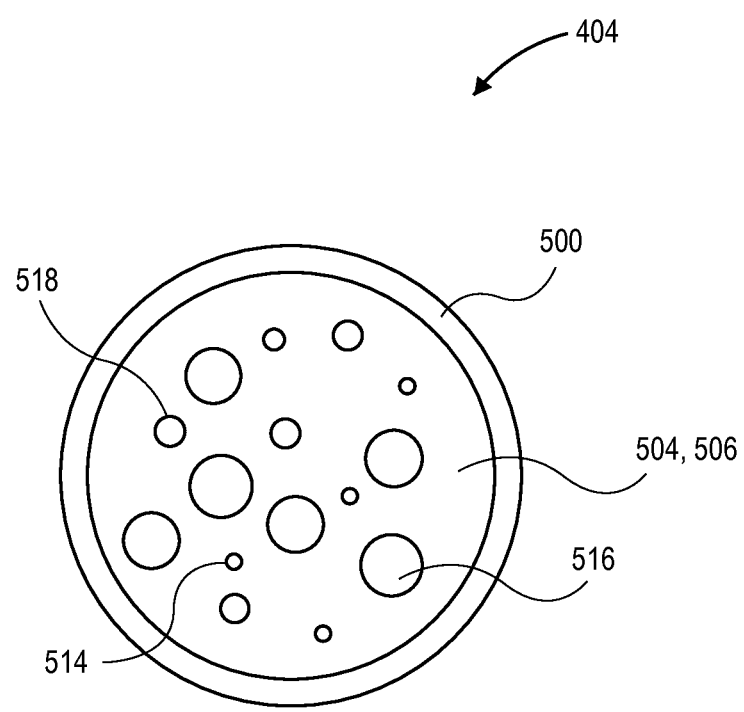

Referring to FIG. 5C, a cross-sectional view of a fluorescent material is shown in accordance with an embodiment. In an embodiment, fluorescent material 404 may include shell 500 surrounding one or more fluorophores and one or more optical absorbers. The one or more fluorophores may include fluorescent dye 504 in solution with solvent 506 to form a fluorescent solution encapsulated by shell 500. Furthermore, the fluorescent material 404 may include a fluorescent pigment 514 suspended within the solution. For example, fluorescent pigment 514 may include one or more fluorescent particles that exhibit predefined fluorescence spectra based on material properties and morphology of the fluorescent particles. Thus, fluorescent material 404 may be tuned to emit multiple fluorescence wavelengths that can be imaged as different colors by photocopier 103.

A first optically absorptive pigment 516 may be suspended within the fluorescent solution. First optically absorptive pigment 516 may include, for example, a black pigment, such as carbon black pigment, or a selective color absorbing pigment. For example, first optically absorptive pigment 516 may be configured to selectively absorb incident light having one or more of peak wavelengths 208, e.g., corresponding to a green color spectrum. In an embodiment, a second optically absorptive pigment 518 may be incorporated within anti-copy optical material, and more particularly, encapsulated within shell 500. Second optically absorptive pigment 518 may be configured to selectively absorb incident light having a different peak wavelength than light absorbed by first optically absorptive pigment 516. For example, second optically absorptive pigment 518 may selectively absorb incident light corresponding to a red color spectrum.

Optically absorptive pigments encapsulated in shell 500 may have be sized and shaped in a range similar to that described above for fluorescent material 404. For example, optically absorptive pigments may have a generally spherical, a cubic, a polygonal, an ellipsoidal structure, etc. An outside dimension of optically absorptive pigments may be in a range of between about 100 nm to 10 mm. More particularly, optically absorptive pigments may have an outside dimension of between about 100 nm to 100 µm.

Figure 6:
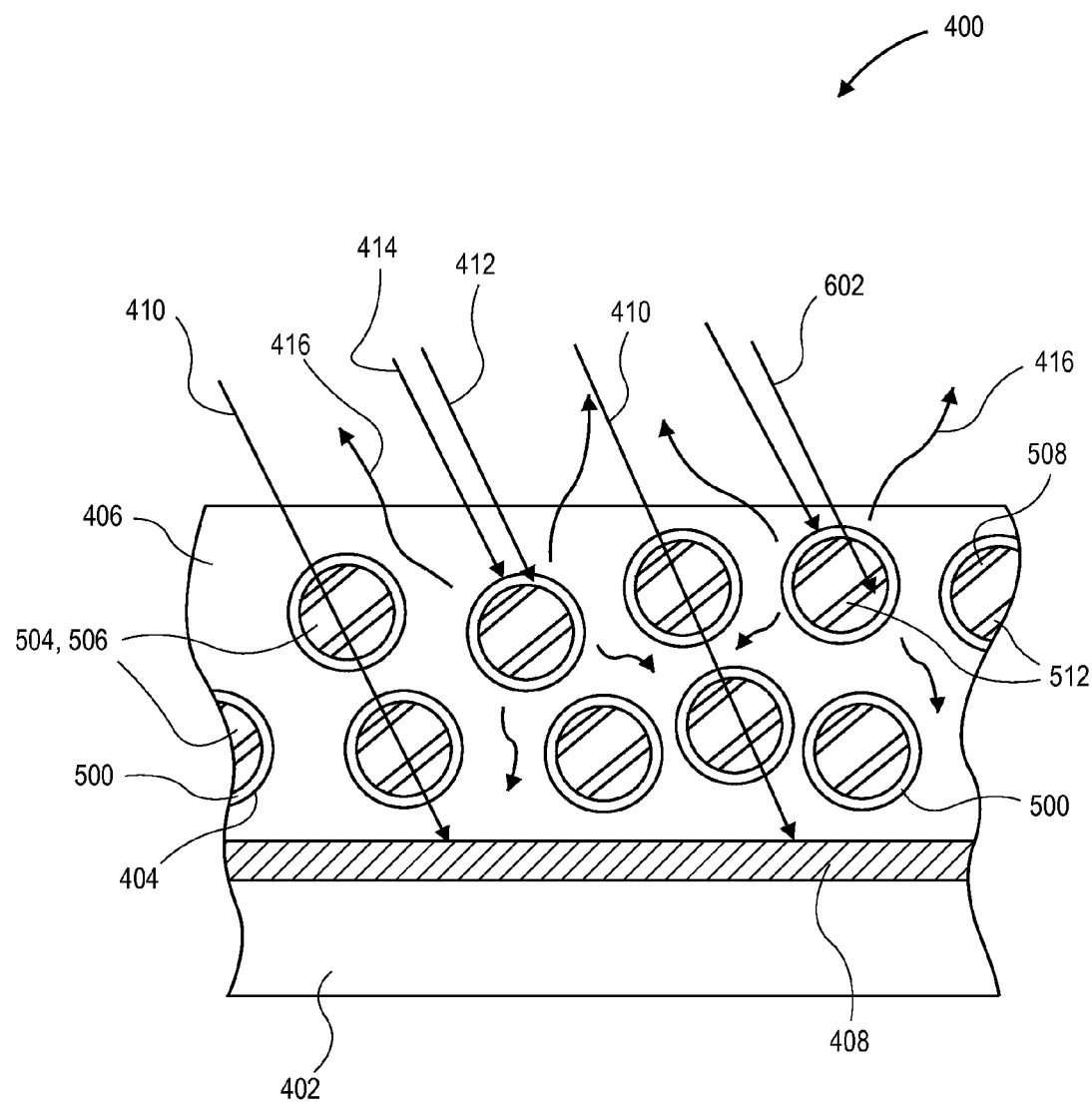
FIGS. 6-10 are partial cross-sectional views of anti-copy optical materials fluorescing under incident light in accordance with various embodiments.

Referring to FIG. 6, a partial cross-sectional view of an anti-copy optical material fluorescing under incident light is shown in accordance with various embodiments. In an embodiment, anti-copy optical material is incorporated on substrate 402. Base layer 408 may be considered as part of anti-copy optical material 400, or it may be separate from anti-copy optical material 400. For example, base layer 408 may be black ink printed over substrate 402 and allowed to set prior to printing of anti-copy optical material 400, or base layer 408 and anti-copy optical material 400 may be consecutively and sequentially printed over substrate 402 very near in time. In either case, base layer 408 may be configured to absorb a broad spectrum of light, including first peak wavelength 410. Thus, base layer 408 may effectively function as a backstop to absorb any incident light that is not absorbed by other optical absorbers in anti-copy optical material 400.

Anti-copy optical material 400 may include a plurality of fluorescent material 404 suspended in binding medium 406. Fluorescent material 404 may have a structure similar to that described with respect to FIG. 5B above. That is, fluorescent material 404 may include shell 500 surrounding a fluorescent solution of fluorescent dye 504 and solvent 506. Furthermore, fluorescent material 404 may include one or more optical absorbers, such as first optically absorptive dye 510 and second optically absorptive dye 512 mixed with and/or dissolved in the fluorescent solution. Thus, fluorescent material 404 and optical absorbers encapsulated within shell 500 may be configured to absorb various wavelengths of incident light in the visible spectrum. For example, fluorescent dye 504 may absorb excitation wavelength 414, e.g., in the blue region of the lamp emission spectrum, first optically absorptive dye 510 may absorb second peak wavelength 412, e.g., corresponding to a peak wavelength in a green spectrum of lamp emission spectra, and second optically absorptive dye 512 may absorb third peak wavelength 602, e.g., corresponding to a peak wavelength in a red spectrum of lamp emission spectra. In an embodiment, fluorescent dye 504 in shell 500 emits fluorescence in response to absorption of excitation wavelength 414. Thus, at least some fluorescence is emitted away from substrate 402 along an optical path that leads to detector array 122 of photocopier 103.

Figure 7:
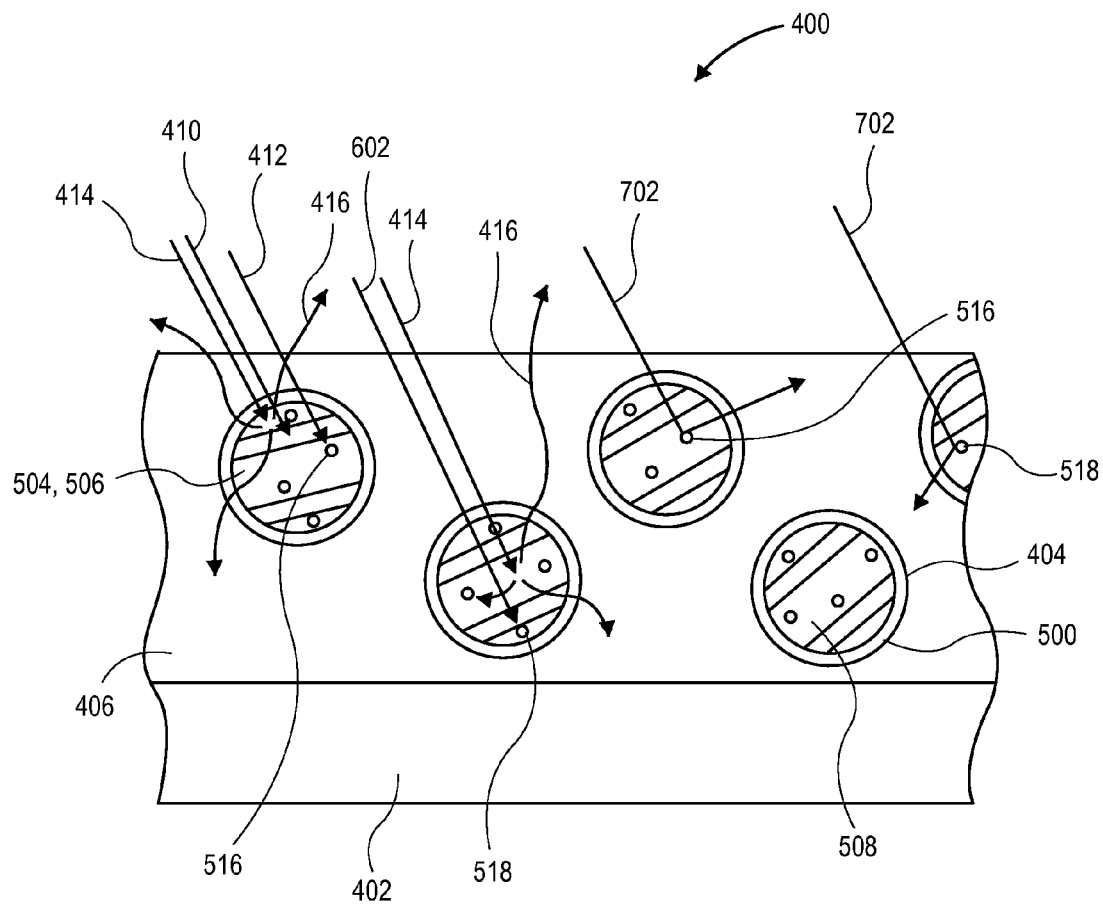

Referring to FIG. 7, a partial cross-sectional view of an anti-copy optical material fluorescing under incident light is shown in accordance with an embodiment. In an embodiment, anti-copy optical material 400 is incorporated on substrate 402. As shown, anti-copy optical material 400 may be printed directly over substrate 402 without an intervening base layer 408. Anti-copy optical material 400 may include a plurality of fluorescent material 404 suspended in binding medium 406. Fluorescent material 404 may have a structure that combines features of the structures described with respect to FIGS. 5B-5C above. That is, fluorescent material 404 may include shell 500 surrounding a fluorescent solution of fluorescent dye 504 and solvent 506. Furthermore, fluorescent material 404 may include one or more optical absorbers. In an embodiment, optical absorbers included within shell 500 include first optically absorptive dye 510, first optically absorptive pigment 516, and second optically absorptive pigment 518. First optically absorptive dye 510 may be mixed with and/or dissolved in the fluorescent solution. First optically absorptive pigment 516 and second optically absorptive pigment 518 may be suspended with the fluorescent solution encapsulated by shell 500.

As described above, fluorescent dye 504 combined with solvent 506 may absorb excitation wavelength 414 of incident light from photocopier 103 and emit fluorescence 416, which directs some fluoresced light along an optical path to detector array 122 of photocopier 103. In an embodiment, each optical absorber is selectively absorptive of a given wavelength of visible light. For example, first optically absorptive dye 510 may absorb first peak wavelength 410, e.g., corresponding to a peak wavelength in a green spectrum of lamp 104 emission spectra, first optically absorptive pigment 516 may absorb second peak wavelength 412, e.g., corresponding to a peak wavelength in a red spectrum of lamp emission spectra, and second optically absorptive pigment 518 may absorb third peak wavelength 602, e.g., corresponding to a peak wavelength in a yellow spectrum of lamp emission spectra. In an alternative embodiment, any of first optically absorptive dye 510, first optically absorptive pigment 516, and second optically absorptive pigment 518 may be broad spectrum optical absorbers, e.g., including carbon black, to absorb substantially all incident light in relatively high-intensity regions and relatively low-intensity regions of the lamp emission spectra.

It is further illustrated that in an embodiment, none of the optical absorbers encapsulated within shell 500 are particularly suited to absorbing a fourth wavelength 702 of visible light, e.g., in an orange color range. Thus, incident light having fourth wavelength 702 may diffract or reflect internally when fluorescent material 404 or encapsulated optical absorbers are encountered. To minimize the amount of incident light having fourth wavelength 702 that returns along an optical path to detector array 122, binding medium 406 may include colorants, e.g., carbon black pigments or blackish dyes, that absorb reflected fourth wavelength 702 of light before it escapes anti-copy optical material 400.

Figure 8:
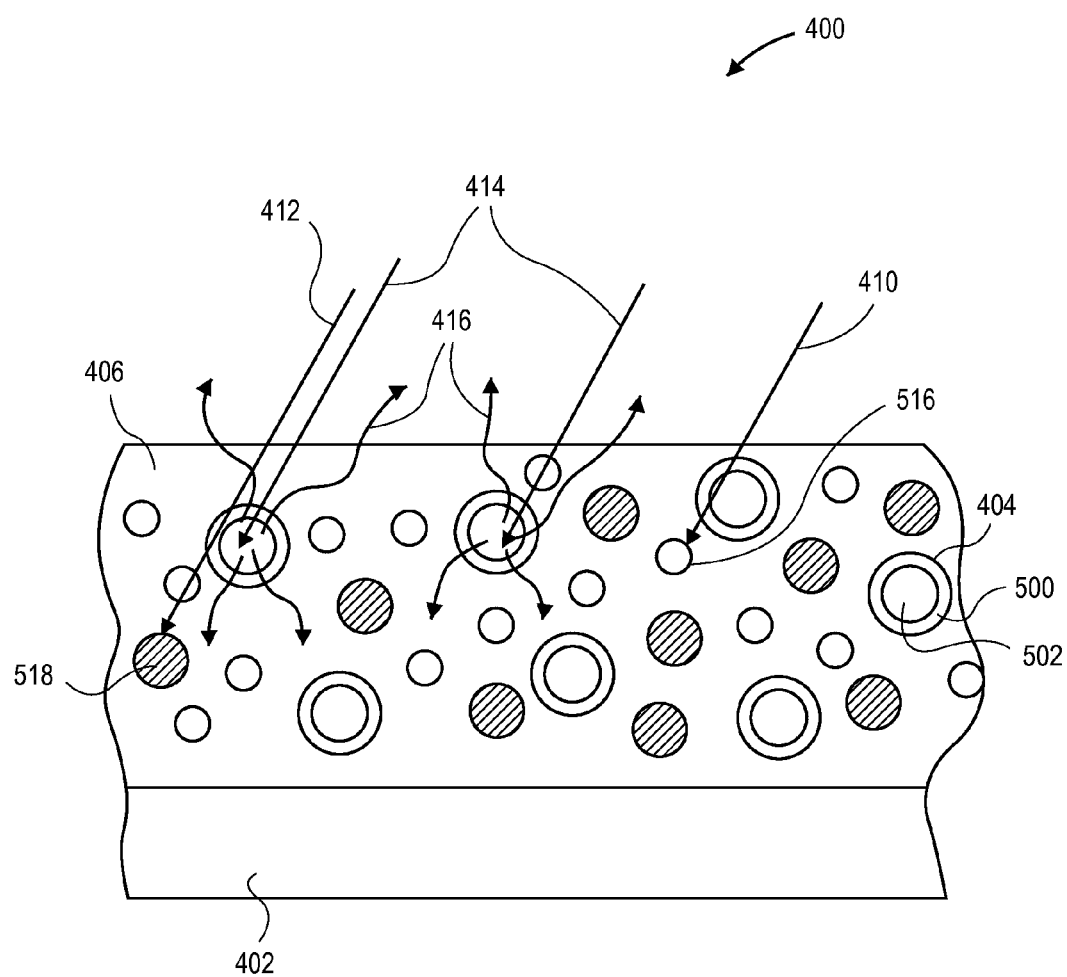

Referring to FIG. 8, a partial cross-sectional view of an anti-copy optical material fluorescing under incident light is shown in accordance with an embodiment. In an embodiment, anti-copy optical material includes fluorescent material 404 having shell 500 surrounding fluorophore 502, and one or more optical absorbers incorporated in binding medium 406 outside of shell 500. As before, fluorescent material 404 may be suspended in binding medium 406 and fluorophore 502 may be configured to absorb incident visible light from photocopier 103 having excitation wavelength 414 and to emit fluorescence 416 having a fluorescent wavelength in the visible spectrum.

In an embodiment, one or more optical absorbers incorporated in binding medium 406 outside of shell 500 include a first optically absorptive pigment 516 and a second optically absorptive pigment 518. The optically absorptive pigments may be configured to absorb a narrow or a broad spectrum of incident light. For example, first optically absorptive pigment 516 may be configured to absorb incident light having first peak wavelength 410, e.g., corresponding to a narrow green color spectrum. However, second optically absorptive pigment 518 may be configured to absorb incident light having second peak wavelength 412, third peak wavelength 602, or fourth wavelength 702. For example, second optically absorptive pigment 518 may integrate black pigment, e.g., carbon black, into binding medium 406 along with first optically absorptive pigment 516 and fluorescent material 404. By combining optical absorbers and fluorescent material 404 in a binding medium 406 without encapsulating the optical absorbers within shell 500, the optical absorbers can contribute to absorption without requiring the photons of incident light to penetrate shell 500. This may reduce light scattering from a surface of shell 500, and thus, enable more absorption of incident light. Although the optical absorbers may absorb some fluorescence 416 emitted by fluorescent material 404, enough fluorescence may still return to detector array 122 to be photocopied as a visible color.

Optically absorptive pigments suspended in binding medium 406 outside of shell 500 may be sized and shaped in a range similar to optically absorptive pigments encapsulated by shell 500, as previously described. For example, optically absorptive pigments may have a generally spherical, a cubic, a polygonal, an ellipsoidal structure, etc. An outside dimension of optically absorptive pigments may be in a range of between about 10 nm to 10 mm. More particularly, optically absorptive pigments may have an outside dimension of between about 100 nm to 100 µm.

Figure 9:
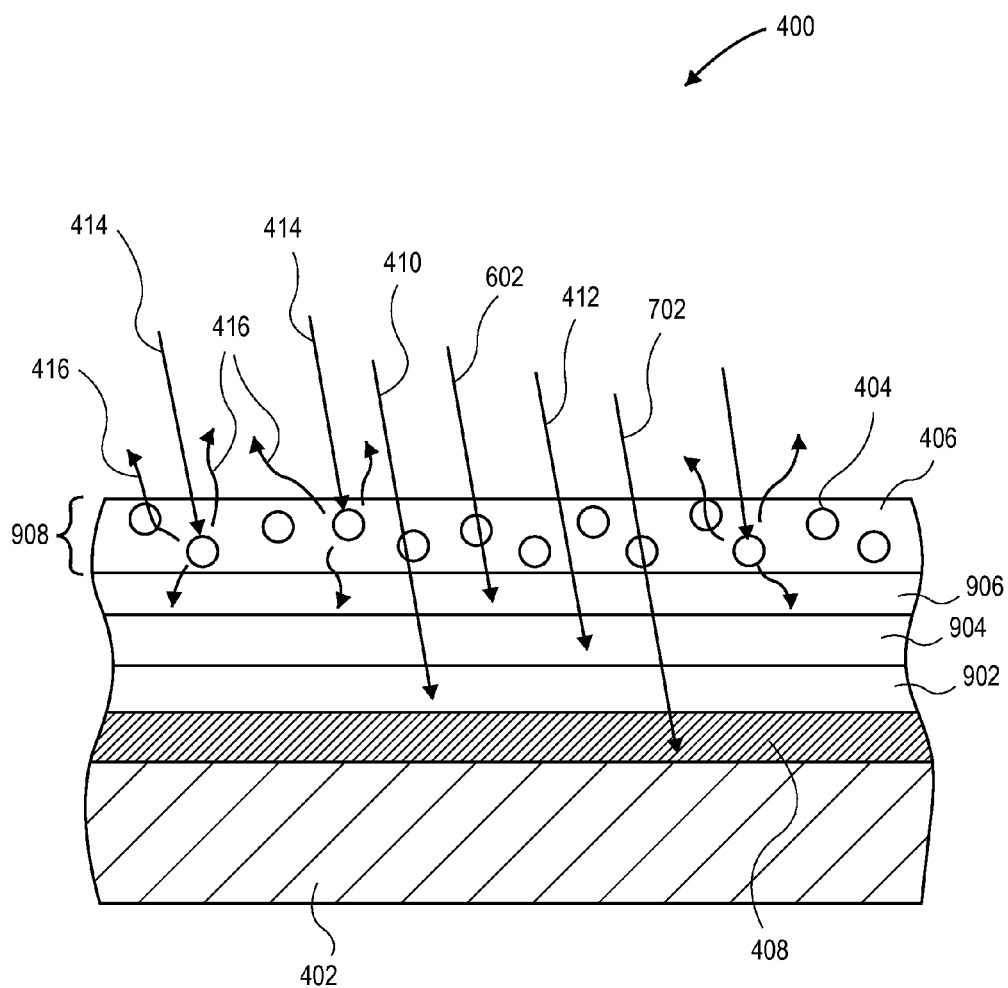

Referring to FIG. 9, a partial cross-sectional view of an anti-copy optical material fluorescing under incident light is shown in accordance with an embodiment. In an embodiment, anti-copy optical material 400 is deposited over base layer 408 printed on substrate 402 and/or base layer 408. Anti-copy optical material 400 may include a layered structure in which each layer acts as fluorescent material 404 and/or an optical absorber. For example, first peak layer 902, second peak layer 904, and third peak layer 906 may function as optical absorbers to absorb a narrow or a broad spectrum of incident light. Each of the layers may include ink printed sequentially over substrate 402. First peak layer 902 may include colored ink configured to absorb incident visible light from lamp 104 having first peak wavelength 410, e.g., corresponding to a green spectrum of the lamp emission spectra. Second peak layer 904 may include colored ink configured to absorb incident visible light from lamp 104 having second peak wavelength 412, e.g., corresponding to a red spectrum of the lamp emission spectra. Third peak layer 906 may include colored ink configured to absorb incident visible light from lamp 104 having third peak wavelength 602, e.g., corresponding to a yellow spectrum of the lamp emission spectra. In an embodiment, base layer 408 may include a dark ink, such as a black ink, configured to absorb a broad spectrum of incident light. Thus, base layer 408 is configured to absorb fourth wavelength 702 that is not absorbed by the peak layers, which are tuned to absorb a narrower spectrum of incident light. The layered ink structure may intrinsically include less scattering because there may in theory be no particle surfaces if all the optically absorptive dyes are dissolved in a respective ink or other binding medium 406. Rearranging the orders of the ink layers would similarly produce the anti-copy effect.

In an embodiment, a fluorescent layer 908 may be printed, deposited, or otherwise incorporated in the layered structure of anti-copy optical material 400. For example, fluorescent layer 908 may be printed on top of the other layers of the structure, or it may be incorporated between or underneath the other layers. Fluorescent layer 908 may include a plurality of fluorescent material 404, such as shell 500 encapsulating fluorophore 502, within binding medium 406. As a result, fluorescent layer 908 may be configured to absorb incident visible light having excitation wavelength 414 and to emit fluorescence 416 having a fluorescent wavelength in the visible spectrum.

Figure 10:
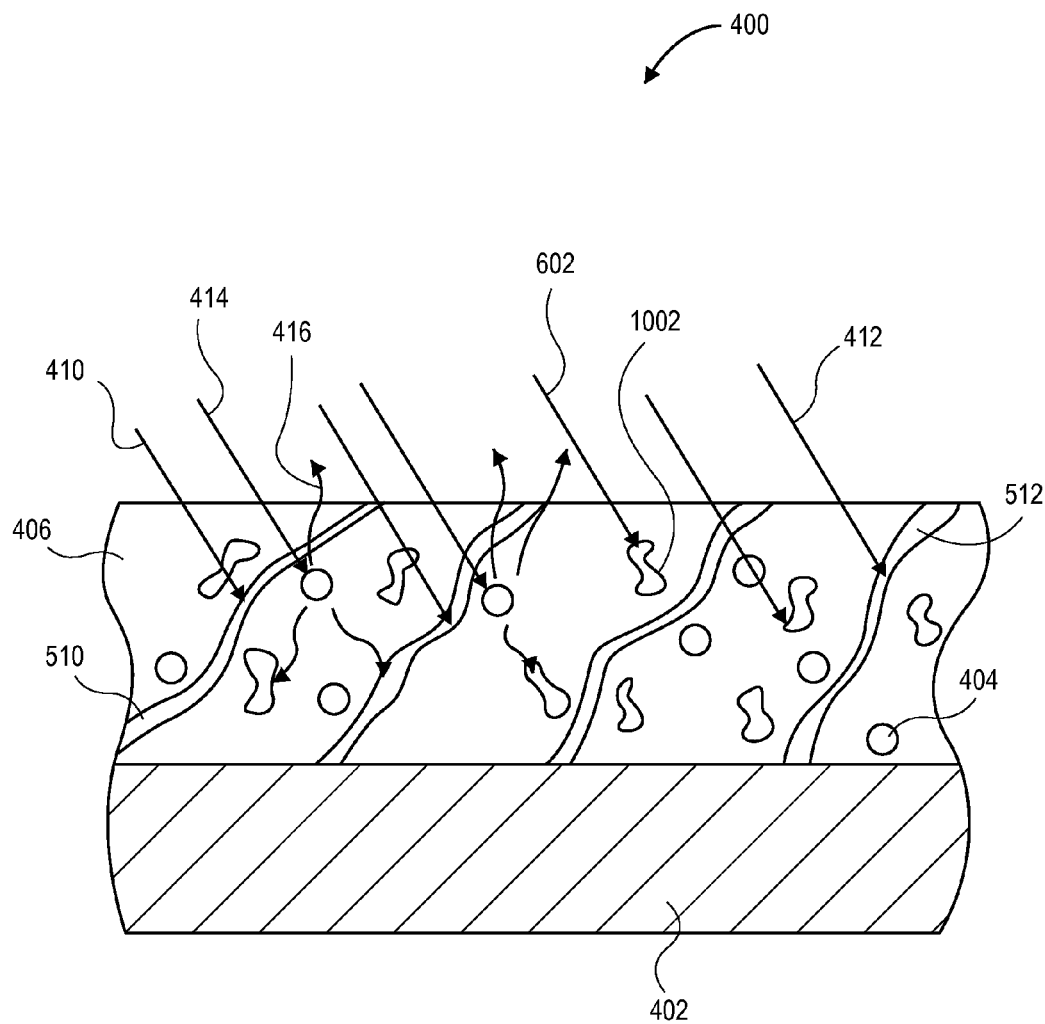

Referring to FIG. 10, a partial cross-sectional view of an anti-copy optical material fluorescing under incident light is shown in accordance with an embodiment. In an embodiment, anti-copy optical material 400 integrates several layers or particles of fluorescent material 404 and several optically absorptive layers into a single printable layer on substrate 402. For example, first optically absorptive dye 510 and second optically absorptive dye 512 may be incorporated as layers within a single printed layer of anti-copy optical material 400. The single printed layer of anti-copy optical material 400 may include one or more other optical absorbers. For example, a third optically absorptive dye 1002 may be mixed into and suspended within binding medium 406. The optically absorptive dyes may have uniform sizes and shapes, or they may be unevenly dispersed throughout binding medium 406. Anti-copy optical material 400 may also include a plurality of fluorescent material 404, e.g., fluorophores, fluorescent dyes, fluorescent pigments, etc. Thus, anti-copy optical material 400 may be configured to absorb visible light and to fluoresce visible light.

In an embodiment, fluorescent material 404 in binding medium 406 is configured to absorb incident visible light having excitation wavelength 414 and to emit fluorescence 416 having a fluorescent wavelength in the visible spectrum. First optically absorptive dye 510 may be configured to absorb incident visible light from lamp 104 having first peak wavelength 410, e.g., corresponding to a green spectrum of the lamp emission spectra. Second optically absorptive dye 512 may be configured to absorb incident visible light from lamp 104 having second peak wavelength 412, e.g., corresponding to a red spectrum of the lamp emission spectra. Third optically absorptive dye 1002 may be configured to absorb incident visible light from lamp 104 having third peak wavelength 602, e.g., corresponding to a yellow spectrum of the lamp emission spectra. Thus, a single ink layer or binding medium 406 may incorporate various layers, inclusions, or constituents that provide for the effect of either absorbing some of incident visible light from lamp 104 and emitting other visible light back to detector array 122, or of absorbing a narrow or a broad spectrum of incident visible light from lamp 104 to substantially suppress nearly all of the scan lamp 104 energy that does not induce fluorescence so that very little scan lamp light returns to the detector array 122 via a collection optical path.

It will be appreciated by one skilled in the art that various features of the embodiments described above may be intermixed and combined to create variant anti-copy optical materials 400 in accordance with this disclosure. However, in any case, a feature formed from a resulting anti-copy optical material 400 and printed on a document 100 would typically appear substantially black to a human viewer, but would photocopy with a substantially larger amount of color consistent with the induced fluorescence. This is because in most cases a relatively small amount of fluorescence would be generated by low-level ambient room lights when viewed by a human, but the detector array 122 of photocopier 103 would receive fluorescence induced by substantially higher intensity lighting from lamp 104. For example, such a feature using a green fluorescent material 404 may look very dark green to black in room lighting, but may copy green. Such a feature may also appear strongly green under any traditional ultraviolet light used for illumination of ultraviolet security features, thereby providing the same utility as existing fluorescent anti-counterfeiting features, as in this case there is virtually no white light in the lamp 104 illumination spectrum to cause visual noise.

Figure 11:
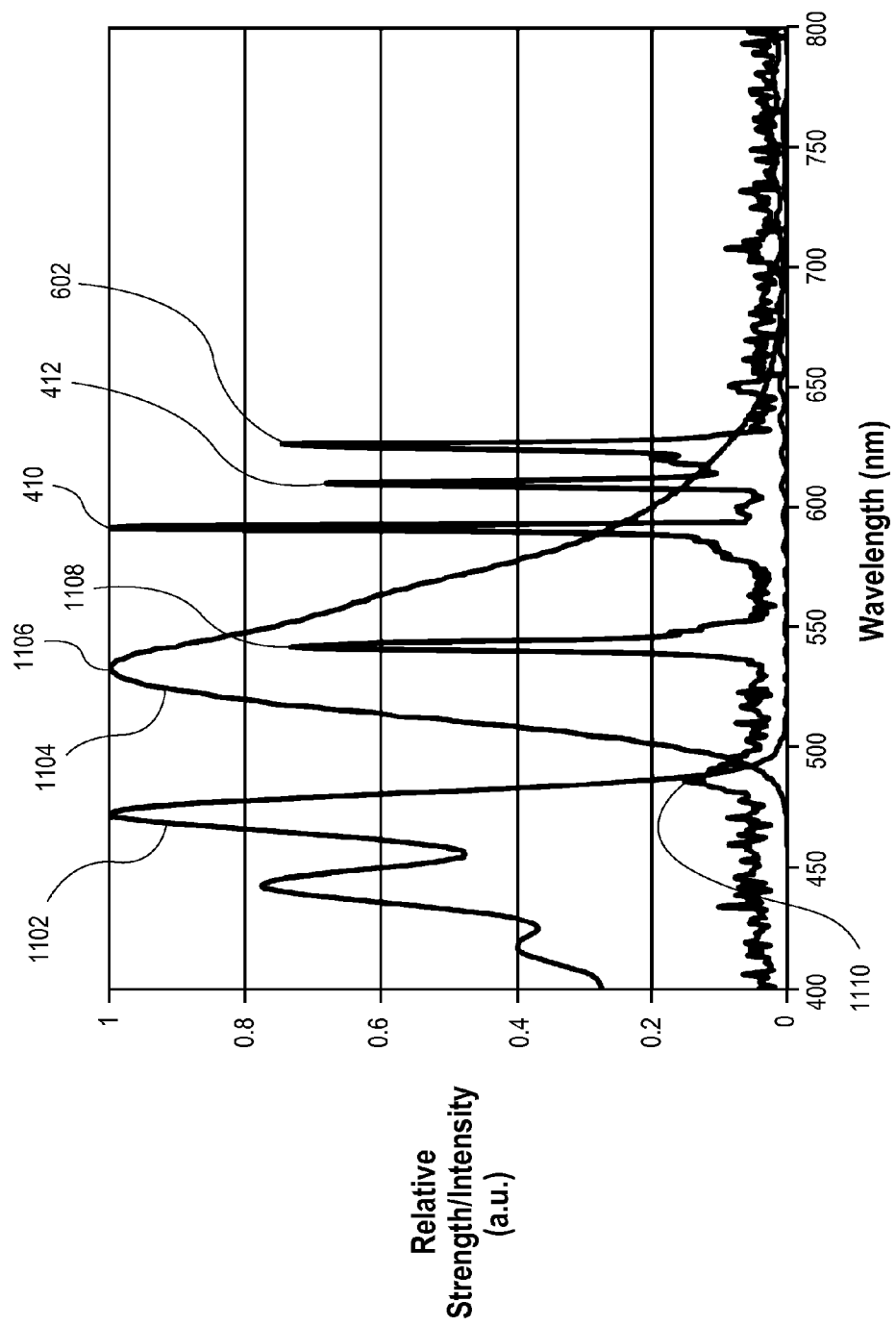
FIGS. 11-12 are graphical representations of a visible spectrum of light emitted by a scan lamp, absorbed by fluorescent material of an anti-copy optical material, and emitted by the fluorescent material in accordance with various embodiments.
Figure 12:
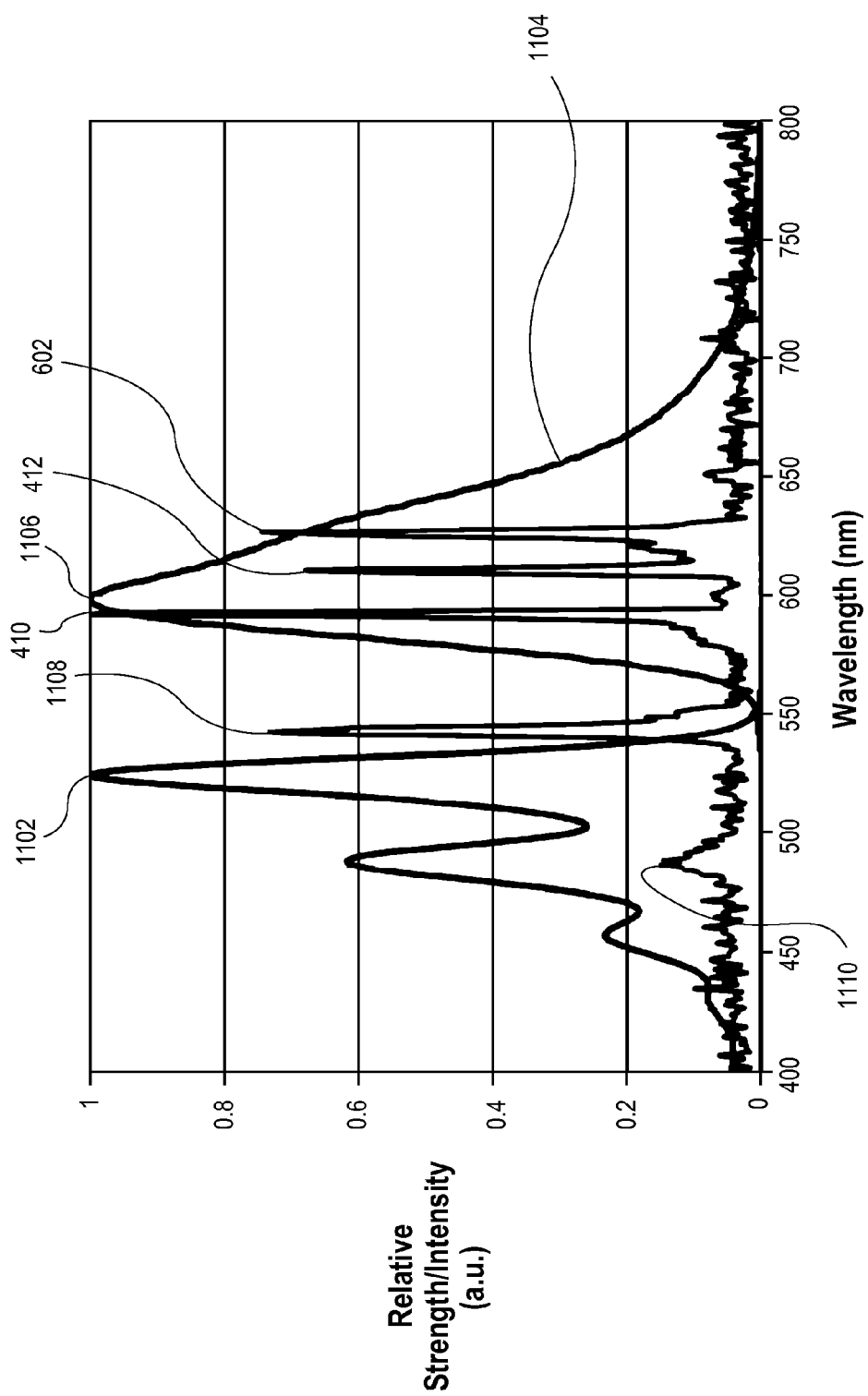

Referring to FIGS. 11-12, graphical representations of a visible spectrum of light emitted by a scan lamp, absorbed by fluorescent material of an anti-copy optical material, and emitted by the fluorescent material is shown in accordance with various embodiments. FIGS. 11-12 also provide an example of a lamp emission spectrum having one or more peak wavelengths 208 of high-intensity. For example, the lamp emission spectrum may include first peak wavelength 410, second peak wavelength 412, third peak wavelength 602, fourth peak wavelength 1108, and fifth peak wavelength 1110, centered within the yellow, orange, red, green, and blue color ranges of the visible spectrum, respectively.

Referring to FIG. 11, absorption and emission spectra of a first example of fluorescent dye that may be incorporated in anti-copy optical material is overlaid on the representative lamp emission spectrum. As shown, fluorescent dye 504 may have general absorption in the ultraviolet and blue regions of the lamp emission spectrum. The absorption of fluorescent dye 504 is indicated by absorbed excitation wavelengths 1102 having several peak wavelengths of increasing intensity. Furthermore, fluorescent dye 504 may emit fluorescence having wavelengths indicated by fluorescence wavelengths 1104. The spectrum of fluorescence wavelengths 1104 may include a peak fluorescence wavelength 1106 centered at around 537 nm.

Referring to FIG. 12, absorption and emission spectra of a second example of a suitable fluorescent dye is overlaid on the representative lamp emission spectrum. As shown, fluorescent dye 504 may have more red-shifted absorption and emission characteristics. For example, fluorescent dye 504 may include several absorption peaks of increasing intensity. A middle absorption peak within absorbed excitation wavelengths 1102 may be centered on a fifth peak wavelength 1110 of lamp emission spectra corresponding to a blue color range, i.e., the middle absorption peak may be centered on the blue scan lamp emission line. This overlap in lamp 104 emission peak and fluorophore 502 absorption peak may provide a strong fundamental absorption and high efficiency fluorescence. As shown, fluorescence wavelengths 1104 may include peak fluorescence wavelength 1106 centered near a first peak wavelength 410 of the lamp emission spectrum corresponding to a green color range of the visible spectrum.

In an alternative embodiment, fluorescent dye 504 incorporated in fluorescent material 404 may have its absorption maxima centered on the blue scan lamp 104 emission line. More particularly, absorbed excitation wavelengths 1102 may include several peak wavelengths of increasing intensity, and the maximum absorption peak may be centered on fifth peak wavelengths 1110 of the lamp emission spectrum. Furthermore, fluorescent dye 504 may emit Stokes' fluorescence with peak fluorescence wavelength 1106 centered roughly between the green (543 nm) and yellow (592 nm) lamp emission peaks. More particularly, a suitable fluorescent dye 504 may generate fluorescent energy in a wavelength band that does not substantially overlap one of the emission peaks of the scanner lamp spectrum. Thus, light returned from anti-copy material may be outside of the peak intensities that the photocopier has been calibrated to receive.

Scanners and photocopiers operate based on the expectation that only light that is diffusely reflected from a document 100 surface, which originated from a calibrated and known lamp 104 spectrum, can return to the detectors. These optical systems are not expecting surges of light at other spectral regions. Thus, if such bands can be created, and if they can pass through the collection path to the detector array 122, they will be recorded as if they were diffusely reflected from the document 100. That is to say, the copier cannot differentiate between reflected scan lamp light and lamp-induced fluorescence that sneaks into the system. By selecting dyes with properties such as those described above, the anti-copy effect may be optimized through absorption of short wavelengths, and emission largely into void areas where the lamps have little to no line strength. This helps to detune a calibration of photocopier 103 as it interferes with the baseline correction scan off of a highly reflective white background that the photocopier 103 uses to assess what spectral content is missing, and thus absorbed, by the colors on the document 100. In other words, the photocopied duplicate is likely to have even less resemblance to the original document 100.

Figure 13:
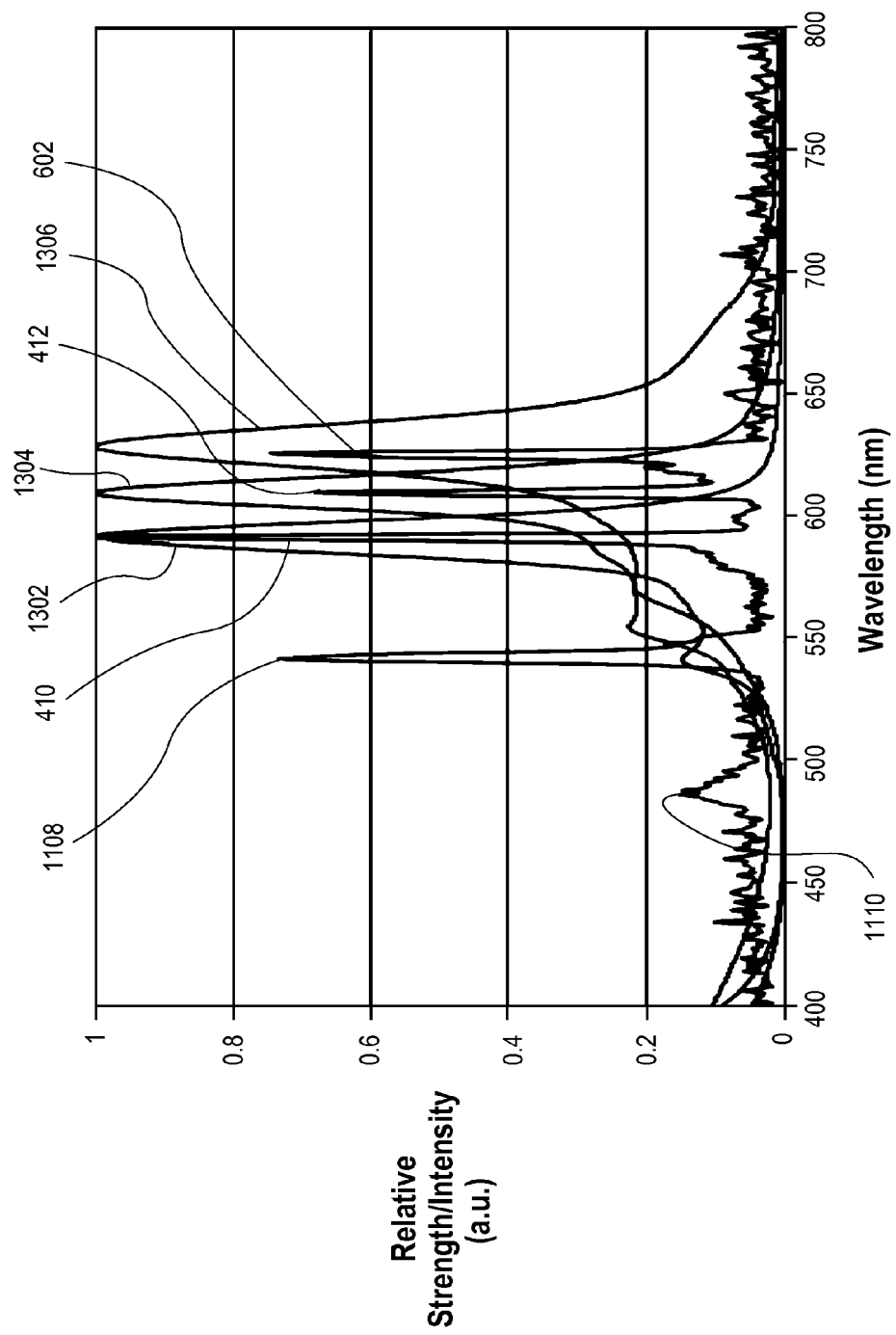
FIG. 13 is a graphical representation of a visible spectrum of light emitted by a scan lamp and absorbed by optical absorbers of an anti-copy optical material in accordance with an embodiment.

Referring to FIG. 13, a graphical representation of a visible spectrum of light emitted by a scan lamp and absorbed by optical absorbers of an anti-copy optical material is shown in accordance with an embodiment. As described above, one or more optical absorbers including optically absorptive dyes, optically absorptive pigments, or black, blackish, or colored ink may be used to absorb either a narrow spectrum or a broad spectrum of incident visible light in the lamp 104 emission spectra. For example, the absorption characteristics of three optical absorbers, e.g., first optically absorptive dye 510, second optically absorptive dye 512, and first optically absorptive pigment 516 is shown overlaid on the lamp emission spectrum. As noted above, lamp emission spectrum may include several peak wavelengths 208 corresponding to different color ranges in the visible spectrum. The optical absorbers may be selected to have optical absorption peak wavelengths that align with the unwanted peaks 208 of the scan lamp emission spectrum. For example, first optically absorptive dye 510 may have first optical absorption peak wavelength 1302 corresponding to first peak wavelength 410, second optically absorptive dye 512 may have second optical absorption peak wavelength 1304 corresponding to second peak wavelength 412, and third optically absorptive dye 1002 may have third optical absorption peak wavelength 1306 corresponding to third peak wavelength 602. These optical absorbers can be optimized to eliminate substantially all of the lamp 104 peaks in the predetermined regions. For example, the optically absorptive dyes, optically absorptive pigments, or black, blackish, or colored ink may be selected and engineered for 1/e absorption of a specific wavelength band. That is, a density of optical absorbers and/or a quantity, thickness, etc. of optically absorbing ink may be selected to ensure that more than about 50%, and possibly between about 75% to 100%, of the incident light in the predetermined wavelength, e.g., at the one or more peak wavelengths of the lamp emission spectrum, may be absorbed. By substantially eliminating the scan lamp energy except for that which is used to induce fluorescence, the spectrum of light that is returned through the collection path to the detector can be very different from what is anticipated. However, if scan lamp 104 energy other than that which is fluoresced by anti-copy optical material 400 were allowed to return to the detector, it may overwhelm the much smaller fluorescence and press it into the noise floor 210 where, even though it exists, it would not be recorded. Accordingly, further consideration may be given to reducing scattered light and diffusely reflected light that is created at refractive and reflective interfaces of anti-copy optical material 400.

Refractive and reflective interfaces may exist in anti-copy optical material 400, for example, between fluorescent material 404 surfaces, binding medium 406, and substrate 402. More particularly, with respect to an anti-copy optical material 400 embodiment described above, refractive interfaces may exist at the interface of binding medium 406 and an outer surface of shell 500, as well as at the interface of an inner surface of shell 500 and the fluorescent solution. The refractive interfaces may scatter light, potentially causing the light to reflect back toward the detector array 122 prior to being absorbed by anti-copy optical material 400. Such reflected light may overwhelm the fluorescent light in the return signal. However, such scattering may be minimized by providing a system in which the refractive index of binding medium 406 ($n_{bm}$), the refractive index of shell 500 ($n_s$), and the refractive index of fluorescent material 404 ($n_{fm}$), closely match. More particularly, the refractive indices of the interface materials may be described by the equation: $\Delta n = n_{bm} - n_s - n_{fm} = 0$. Alternatively, the refractive indices may satisfy the equation: $\Delta n = n_{bm} - n_s = n_s - n_{fm} = 0$. Alternatively, $\Delta n$ may be larger than zero while the refractive indices of the interface materials may nonetheless closely match. For example, $\Delta n$ may be in a range between about 0 to 5.0, while still allowing for scattering to be minimized to a point at which fluorescent energy returned to detector array 122 is not overwhelmed by scattered energy at other wavelengths and remains above a noise floor of the returned signal.

As described above, features formed with anti-copy optical material 400 on substrate 402 may appear differently when photocopied as compared to when viewed under ambient light. Most ambient light is either incandescent or fluorescent, and may include similar peak wavelengths 208, though of lower intensity relative to what lamp 104 uses to illuminate document 100 for photocopying. Thus, there may still be a small amount of fluorescence emanating from a printed anti-copy optical material 400 feature under normal viewing conditions, which may give the feature a slight hue that is not entirely black. Nonetheless, this slight hue can be of benefit to the anti-copy functionality of anti-copy optical material 400. The human eye is very sensitive to even low levels of light. Thus, a viewer can sometimes see a small amount of visible fluorescence that is generated by ambient light on the anti-copy feature. The amount of filtering of the scan lamp 104 peaks, i.e., the efficacy of optical absorbers, may be controlled to provide for a nominal amount of fluorescence to be present under normal viewing. This nominal amount of fluorescence may be selected to be viewable by a human, but not high enough to be photographable by a camera. This further helps to prevent counterfeiting that might be done by a camera, specifically a smart phone or other digital camera. Proper matching or contrasting of the appearance of the fluorescent anti-copy regions, in proximity to other colors or hues that do not have anti-copy attributes, will act to enhance the anti-copy features on protected documents.

By way of example, documents may incorporate anti-copy features that, once fluorescence has been produced, is discernable to a human viewer, but is too low in intensity to be photographed. In an embodiment, an anti-copy region includes a very slight greenish appearance when viewed in ambient fluorescent light, but appears entirely black when photographed with a digital camera. Furthermore, when photocopied, the anti-copy regions may appear as a bright green region, due to exposure to the high-intensity lamp 104 of the scanner. Thus the anti-copy aspects of the embodiments described above may help to protect against both direct photocopying and camera photography counterfeiting.

Although several of the embodiments described above describe the use of black ink, black dye, or black pigment as a complementary optical absorber to absorb substantially all incident light that is not otherwise absorbed by other optical absorbers in anti-copy optical material 400, some embodiments may allow for selective reflection of certain wavelengths other than the fluorescence wavelengths 1104 of fluorescent material 404. For example, colorants with narrow optical reflectivity and/or absorption ranges could be used to absorb some, but not all, of the color ranges present in a lamp emission spectrum. Accordingly, an anti-copy feature may be designed that is not very, very dark or black, and which when photocopied, shows the fluorescent emission and a non-black reflected spectrum. The fluoresced color range and the reflected spectrum may be combined in an image to provide for a wider variety of color combinations that go beyond a nominal black ambient appearance 1402 and a photocopy color of the selected fluorescent wavelength.

The anti-copy optical material embodiments above may be manufactured at varying levels of integration. For example, anti-copy optical material 400 may be manufactured to include fluorescent material 404 and optical absorbers already dispersed within an ink. Alternatively, fluorescent material 404, such as shell 500 surrounding fluorophore 502, may be provided to an end user separately, and the end user may mix the fluorescent material 404 pigment, along with one or more separately provided optical absorbers, into a self-provided ink, such as a black or blackish ink.

Although several of the embodiments described above describe the use of a fluorescent material 404 to fluoresce light that is captured and imaged by a photocopier 103, one skilled in the art will recognize that other materials may be substituted to generate a similar anti-copy effect. For example, rather than using a fluorescent material 404, such as a fluorophore 502, a fluorescent dye 504, or a fluorescent pigment 514, an alternative material may be used that absorbs light in a first wavelength and emits light in a second wavelength. For example, other luminescent materials, such as phosphorescent materials may be used. Such phosphorescent materials may include a phosphor, including phosphorescent transition metal compounds or phosphorescent rare earth compounds to absorb incident visible light having an excitation wavelength 414 and to emit visible light along an optical path to detector array 122.

Other suitable materials include quantum dots, which are nanocrystals typically made from semiconductor materials that exhibit fluorescence spectrums dependent on the quantum dot size. More particularly, the absorption and fluorescence characteristics of quantum dots can be controlled through appropriate quantum dot size selection. Thus, in an embodiment, fluorescent material 404 may include quantum dots of one or more sizes that absorb a variety of incident light wavelengths and fluoresce a variety of fluorescent wavelengths. Accordingly, the complexity of a returned light signal can be varied considerably, making successful attempts to override an anti-copy feature even more difficult to achieve. Although quantum dots have historically included heavy metals, such as cadmium, advances in cadmium-free quantum dots may promote the commercial viability of such an embodiment.

Anti-copy optical material 400 as described above may be used to create features, which when incorporated into a document 100 in various manners, contribute to an anti-copy or anti-counterfeiting effect. As described above, an anti-copy feature may have an initial appearance to a viewer in ambient light and a different appearance when photocopied. This bi-modal appearance attribute of an anti-copy feature may be augmented and enhanced by placing the anti-copy feature next to, on top of, and/or in close proximity to other regions of appropriate colors to help reveal, conceal, or complicate an area. For example, a region of the document 100 that has been printed with the anti-copy optical material 400 and possibly in conjunction with other non-anti-copy optical materials, may be termed the anti-copy feature. Accordingly, hidden information, which is effectively embedded in the anti-copy region, can be "concealed" or "revealed" when sufficient contrast is induced in the image.

Figure 14A:
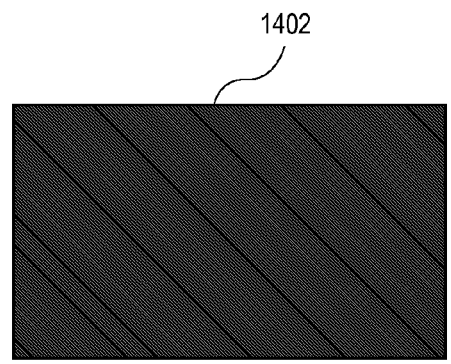
FIGS. 14A-14C are pictorial views illustrating a contrast reveal usage paradigm in accordance with an embodiment.
Figure 14B:
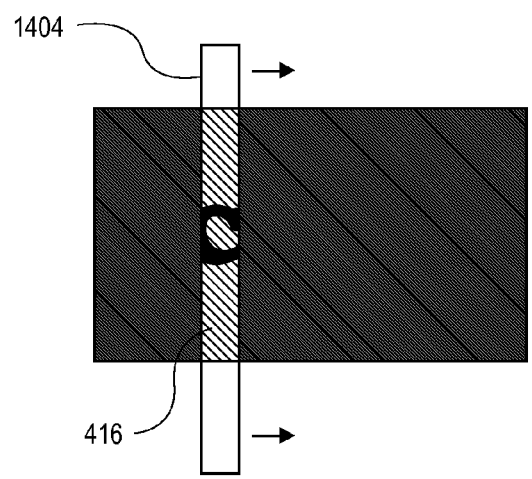
Figure 14C:
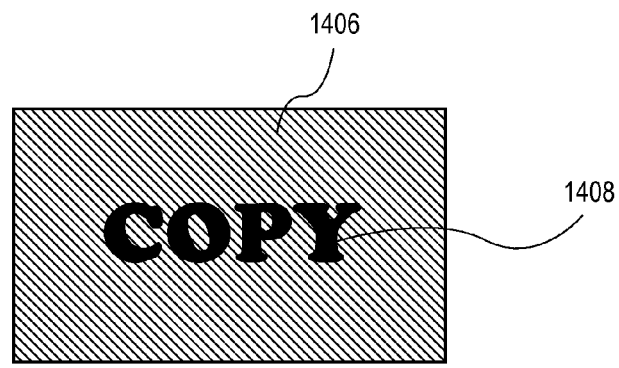

Referring to FIGS. 14A-14C, pictorial views illustrating a contrast reveal usage paradigm is shown in accordance with an embodiment. FIG. 14A shows ambient appearance 1402 of an anti-copy feature that includes anti-copy optical material 400 printed beside a portion of document 100 that only includes a non-fluorescing portion, e.g., black or colored ink. Under low-intensity ambient lighting, fluorescence from anti-copy optical material 400 may be minimal, and thus, there may be little or no noticeable difference between the anti-copy optical material 400 regions and the non-fluorescing regions of the anti-copy feature. FIG. 14B shows a scan region 1404 of the document 100 as high-intensity visible light is directed to the document and imageable reflected light 120 is returned to detector array 122 of photocopier 103. In an embodiment, scanning the document 100 reveals information content that has been previously submerged or hidden. For example, a character string may be revealed as a bright color against a dark background or a dark word against a bright background. The bright color regions correspond to regions printed with anti-copy optical material 400, from which fluorescence 416 is emitted under illumination from high-intensity scanning light, and the dark colors correspond to a black or colored non-fluorescing ink that has a similar appearance under either ambient or high-intensity lighting. In either case, as shown in FIG. 14C, anti-copy feature may appear under ambient lighting to be uniformly colored, and thus harbor no information content. However, when photocopied, the anti-copy area 1406 may stand out from the non-fluorescing area and a revealed feature 1408 may become apparent, thus showing the hidden content information. Though these examples show simple characters that could be altered in appearance using graphic software packages that graphically edit a copied image file, a more complex image based on the same invention would prove much more difficult to modify, therefore reducing the current ease in which a banknote or other document can be counterfeited.

Figure 15A:
FIGS. 15A-15C are pictorial views illustrating a contrast conceal usage paradigm in accordance with an embodiment.
Figure 15B:
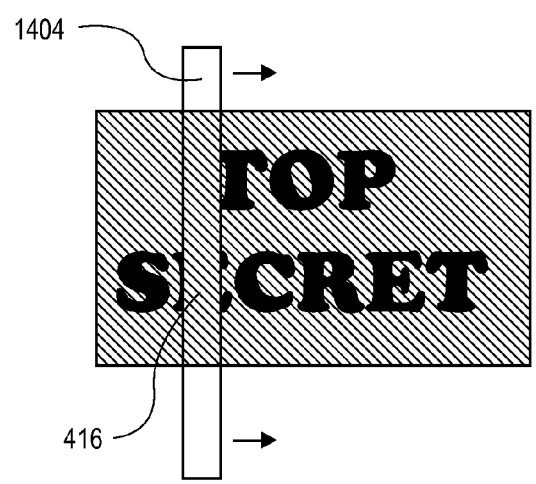
Figure 15C:
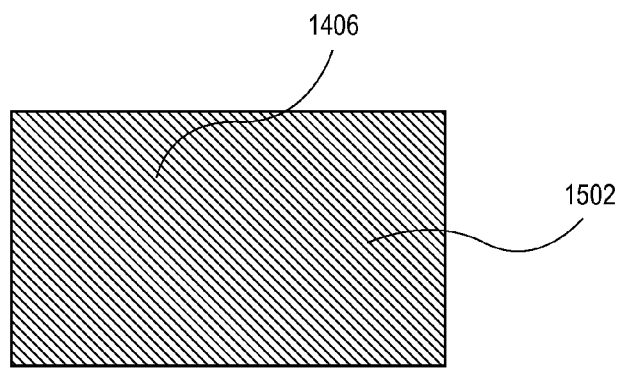

Referring to FIGS. 15A-15C, pictorial views illustrating a contrast conceal usage paradigm is shown in accordance with an embodiment. FIG. 15A shows ambient appearance 1402 of an anti-copy feature that includes anti-copy optical material 400 printed beside a portion of document 100 that only includes a non-fluorescing region, e.g., colored ink. Under low-intensity ambient lighting, fluorescence from anti-copy optical material 400 may be minimal, and thus, anti-copy optical material 400 may stand out compared to the colored ink. According, a character string, such as "Top Secret", may be apparent to a viewer. FIG. 15B shows a scan region 1404 of the document 100 as high-intensity visible light is directed to the document and imageable reflected light 120 is returned to detector array 122 of photocopier 103. In an embodiment, scanning the document 100 conceals information content that has been previously viewable. For example, the character string may be concealed as a bright color against a bright background or a bright word against a bright background. More particularly, the anti-copy optical material 400 may fluoresce a bright color similar to the color of the non-fluorescing regions, thereby hiding the content information. In either case, as shown in FIG. 15C, anti-copy feature may appear under ambient lighting to display content information, however, when photocopied, the anti-copy area 1406 may blend in with the non-fluorescing area to hide concealed feature 1502 and the corresponding content information.

Figure 16A:
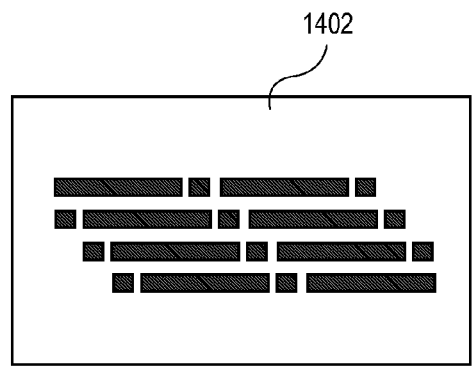
FIGS. 16A-16C are pictorial views illustrating a contrast reveal usage paradigm applied to a complex image in accordance with an embodiment.
Figure 16B:
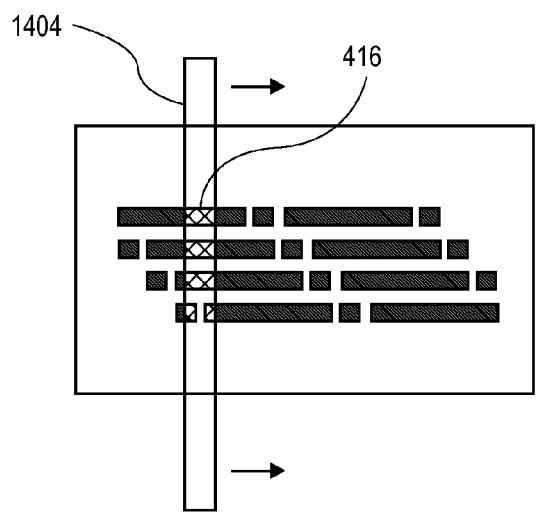
Figure 16C:
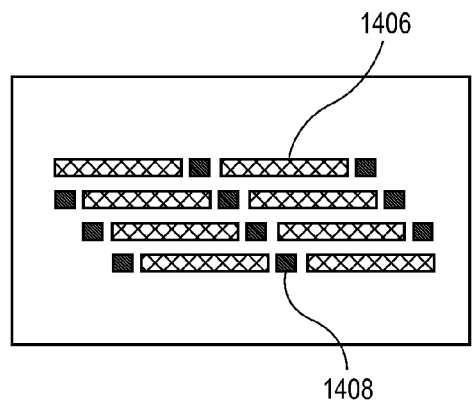

Referring to FIGS. 16A-16C, pictorial views illustrating a contrast reveal usage paradigm applied to a complex image is shown in accordance with an embodiment. Referring to FIG. 16A, the long thin lines illustrate how the image content can be more complex using non-contiguous linear features, such as in intaglio printing, which is used in banknote printing. Furthermore, the printed regions may be physically separated from each other and in close proximity, although not necessarily directly adjacent to one another. As described above, certain areas, such as the non-contiguous linear features, may be printed with anti-copy optical material 400, while other features, such as the dots between linear features, may be printed with non-fluorescing dark ink. Accordingly, the anti-copy feature may have a uniformly dark ambient appearance 1402, as shown in FIG. 16A. As shown in FIG. 16B, scan region 1404 may be moved across the anti-copy feature, causing anti-copy optical material 400 to emit fluorescence 416. Referring to FIG. 16C, the entire scanned anti-copy feature may be combined into an image or physical copy, which displays anti-copy area 1406 as being bright colored, and therefore distinguished from the dark dots of revealed feature 1408, which may include information content. By creating a complex image of this nature, a prospective counterfeiter must perform a substantial amount of work on the scanned image to render it passable as a legitimate document to an unwary party.

Figure 17A:
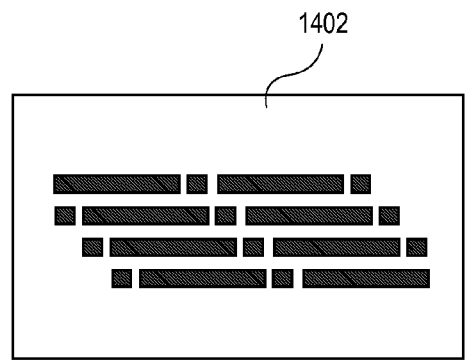
FIGS. 17A-17C are pictorial views illustrating a contrast reveal usage paradigm applied to a complex image having multiple colors and color gradients in accordance with an embodiment.
Figure 17B:
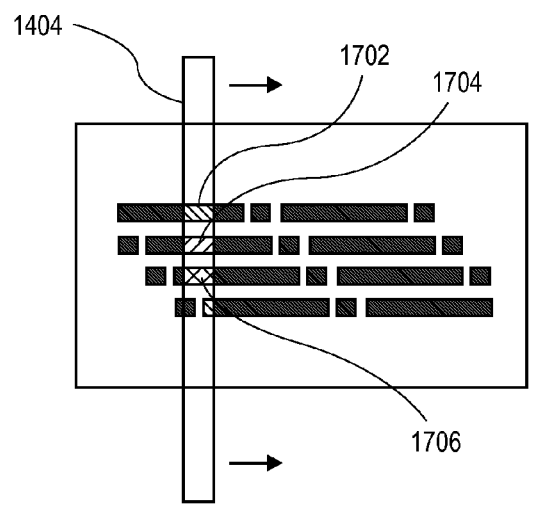
Figure 17C:
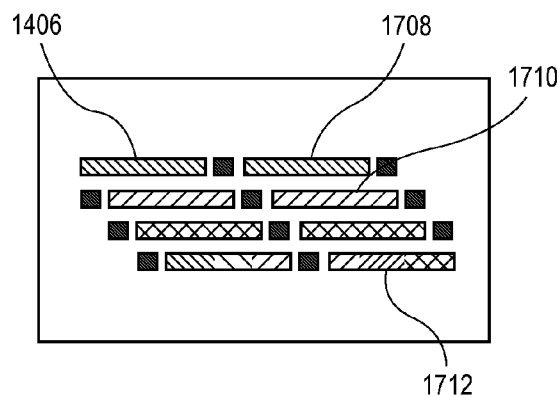

Referring to FIGS. 17A-17C, pictorial views illustrating a contrast reveal usage paradigm applied to a complex image having multiple colors and color gradients is shown in accordance with an embodiment. The usage paradigm applies to the use of contrast reveal with multiple colors, all of which can be induced via Stokes' fluorescence. Referring to FIG. 17A, the printed linear features may be physically separated from each other and in close proximity, although not necessarily directly adjacent to one another. As described above, certain areas, such as the non-contiguous linear features, may be printed with anti-copy optical material 400, while other features, such as the dots between linear features, may be printed with non-fluorescing dark ink. In an embodiment, different anti-copy optical materials 400 are used to print different linear features, and thus, one linear feature may emit fluorescence at one wavelength and another linear feature may emit fluorescence at another wavelength. However, under ambient lighting, the various linear features of the anti-copy feature may have a uniformly dark ambient appearance 1402, as shown in FIG. 17A. As shown in FIG. 17B, scan region 1404 may be moved across the anti-copy feature, causing anti-copy features to emit fluorescence 416. More particularly, each of the different anti-copy optical materials 400 in anti-copy feature may emit separate fluorescences, e.g., first fluorescence 1702, second fluorescence 1704, and third fluorescence 1706, at different wavelengths. Referring to FIG. 17C, the entire scanned anti-copy feature may be combined into an image or physical copy, which displays anti-copy area 1406 as including a plurality of differently colored features, e.g., first revealed feature 1708, second revealed feature 1710, and third revealed feature 1712 corresponding to the different fluoresces. More particularly, the differently colored revealed features 1408 may represent a revealed feature or may reveal another feature printed with non-fluorescing ink, e.g., as represented by the non-fluorescing dots. The revealed feature may include a non-fluorescing feature set against a background of diverse colors, thus creating a complex image that would require a substantial amount of editing of the scanned image to render it passable as a legitimate document to an unwary party.

Figure 18:
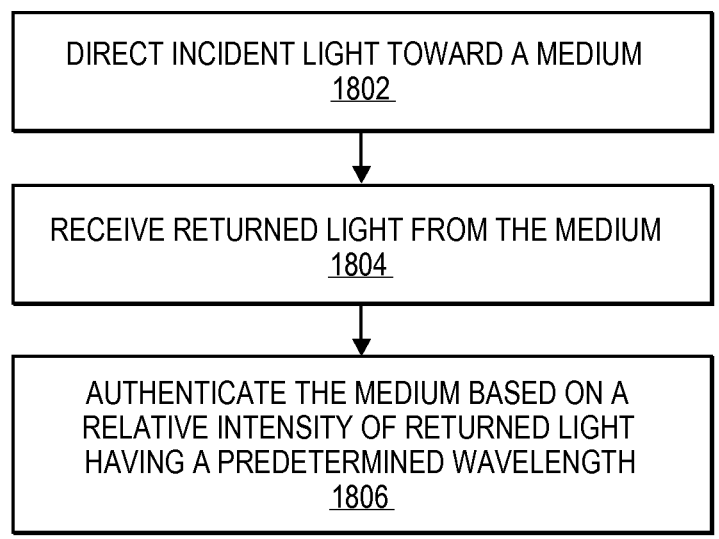
FIG. 18 is a flowchart of a method of authenticating a medium based on an illumination in accordance with an embodiment.

Referring to FIG. 18, a flowchart of a method of authenticating a medium based on an illumination is shown in accordance with an embodiment. At operation 1802, incident light may be directed toward a medium. For example, a document 100 have an anti-copy feature printed on substrate 402 may be placed on platen 102 of photocopier 103 and a copy function may be initiated to cause lamp 104 to emit high-intensity lamp emission spectra toward the document 100. Alternatively, a document 100 may be illuminated by a light source on a tablet or smart phone. At operation 1804, an amount of returned light may be received from the medium. For example, light may be reflected and/or fluoresced from document 100 and anti-copy feature included on substrate 402, and returned to detector array 122. Alternatively, returned light from the document 100 may be captured and imaged by a camera on a tablet, smart phone, or other imaging device. At operation 1806, the medium may be authenticated as being legitimate based on a relative intensity of returned light having a predetermined wavelength. As described above, in the case of an anti-copy feature printed on a banknote using a contrast reveal paradigm, fluorescence 416 emitted from anti-copy feature may have a relative intensity above a noise floor of the returned light signal. More particularly, in an embodiment in which substantially all light except for fluoresced light is absorbed by anti-copy feature, the relative intensity 202 of light having a fluorescent wavelength may approach unity, e.g., 100% or 1.0 a.u. on a y-axis 202, as compared to other returned light wavelengths along an x-axis 204. Thus, processing logic embedded within photocopier 103, a tablet, a smartphone, or similar scanning equipment may be used to evaluate image data corresponding to returned light in order to detect whether the banknote or an edited copy of a banknote, both of which may appear authentic under ambient lighting regardless of whether they include anti-copy optical material 400, is in fact legitimate currency. In an embodiment, additional processes such as reproducing a physical copy may be enabled or disabled based upon the determination of authenticity. Furthermore, photocopier 103 or other scanning equipment may be configured to display an indication of legitimacy based on the determination of authenticity.

In addition to being an anti-copy counterfeiting deterrent for banknotes using platen-based document scanning and photocopying, the present invention can be used to provide a means of identifying other documents, such as linear barcodes or matrix barcodes, e.g., QR codes. These codes, which are small and which are generally found on products for sale, e.g., food, clothing, electronics, event tickets, etc., are also easily counterfeited. As anti-copy features may be created as described above to result in an altered appearance under illumination from bright white lights, the LED flash on a cell phone or other portable device can be used to induce the effect as well. This is because the barcodes are small and can be flash-photographed at close enough range to induce the fluorescence. In addition, under exposure from a cell phone flash, a photograph can be taken for documentation and analysis purposes. Using contrast reveal or conceal usage paradigms, certain information, that is not readily visible on the QR code under ambient lighting, can be exposed and used to identify the label as being either authentic or counterfeit. Appropriate software applications executing on a cell phone may be used to compare captured images of a candidate QR code to large databases of information accessed over a network connection. Thus, by authenticating the candidate QR code against legitimate QR codes, the products to which the candidate QR code is attached may be identified as an authentic or counterfeit product. Such authentication may be employed to track and trace trends in the counterfeiting production process. Having a documented chain of illicit products can be used to both halt the production, and legally to prosecute the perpetrators.

Figure 19:
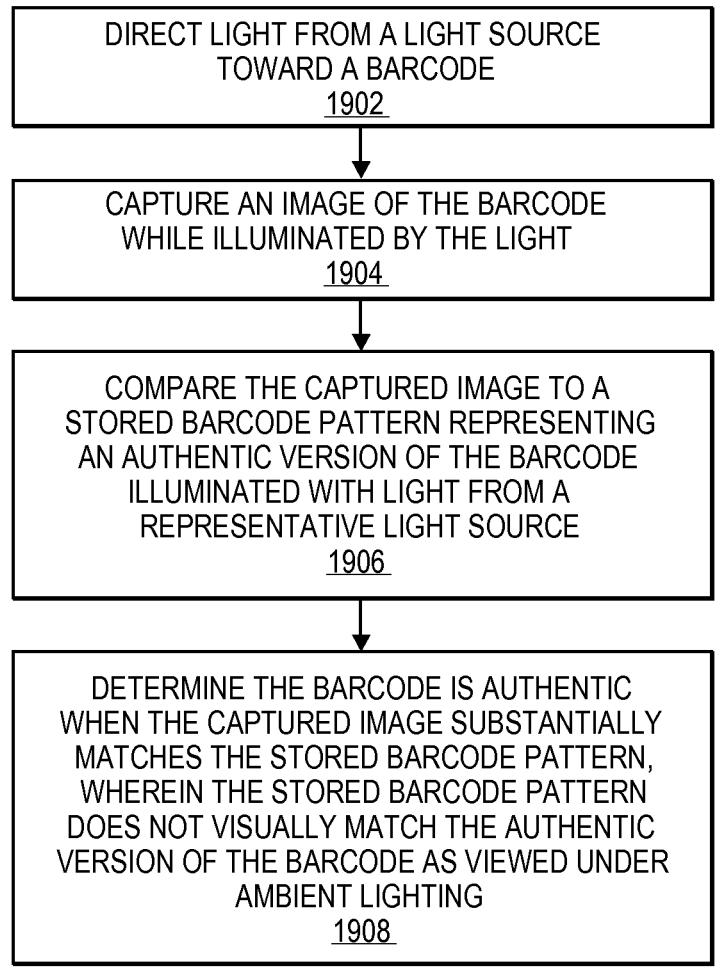
FIG. 19 is a flowchart of a method of authenticating a barcode based on a captured image of the barcode in accordance with an embodiment.

Referring to FIG. 19, a flowchart of a method of authenticating a barcode based on a captured image of the barcode is shown in accordance with an embodiment. At operation 1902, light may be directed from a light source toward a barcode. For example, a flash light source on a smartphone or tablet may be activated and used to illuminate a QR code. Similar to lamp 104 used in photocopier 103, flash light sources on a tablet or smartphone include an emission spectrum having one or more peak wavelengths 208 of light in a visible spectrum. In an instance, the QR code may include an anti-copy feature intended to be exposed under a contrast reveal usage paradigm. Thus, light from the light source may be expected to induce sufficient fluorescence to alter an imaged anti-copy optical material 400 printed on the QR code. At operation 1904, an image of the barcode may be captured while the barcode is illuminated. For example, the smartphone or tablet having the light source may also have a camera used to capture an image of the QR code. At operation 1906, the captured image may be compared to a stored barcode pattern representing an authentic version of the barcode illuminated with light from a representative light source. For example, the captured image and or data associated with the captured image may be compared by processing logic of the smartphone or tablet to a representative pattern or image stored on the device, or accessed by the device across a network. For example, a database on stored on a server and accessible through the internet may store registered QR codes to allow client devices to download an authentic representation of a barcode. In an embodiment, the authentic representation of the barcode represents an image of the barcode taken while the barcode was illuminated with light from a representative light source similar to the light source used by the device. Thus, the representative pattern may include an image that includes the revealed anti-copy feature. Furthermore, in an embodiment, the authentic representation of the barcode does not visually match an authentic version of the barcode when viewed under ambient lighting. For example, the stored authentic representation may include colored regions corresponding to a printed anti-copy optical material 400 and those colored regions may appear differently colored, e.g., dark, on an authentic barcode when viewed under ambient lighting. More particularly, the colored regions and/or anti-copy features printed on a QR code may only be evident according to a contrast reveal usage paradigm when the QR code is illuminated by a high-intensity flash from a scanning device. The downloaded representation may be compared to the portions of the captured image extracted by image processing software on the device. This comparison may use image processing to detect whether, e.g., an expected revealed feature is printed on the candidate QR code. At operation 1908, the comparison may be used to determine whether the candidate QR code is authentic. More particularly, when the compared portions of the captured image substantially match the stored barcode pattern, the candidate QR code may be determined to be authentic. Optionally, in response to the determination of legitimacy, the device may display an indication of authenticity to a user or enable further processing by the device, e.g., navigating to a website associated with the authenticated QR code or product.

Figure 20:
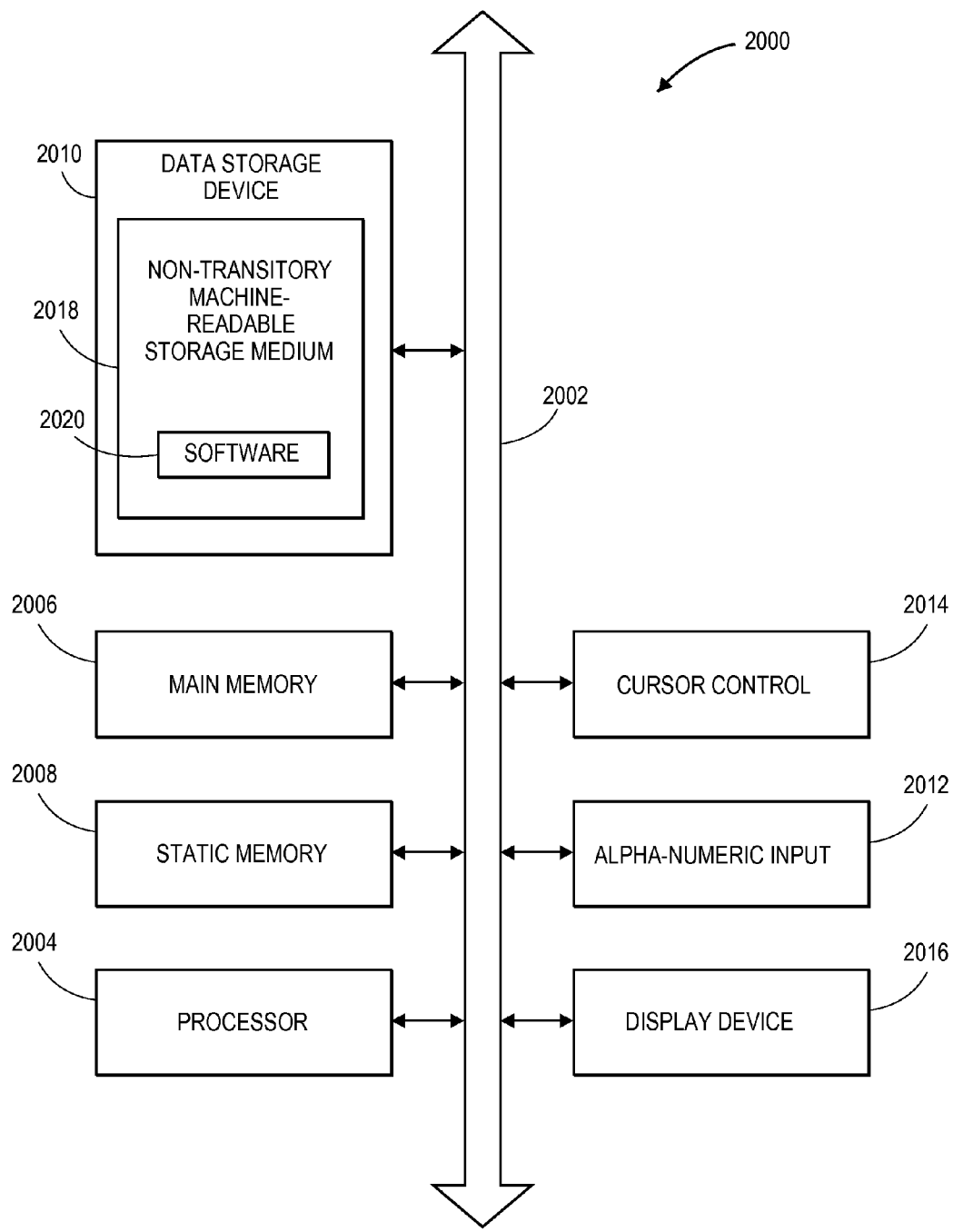
FIG. 20 is a schematic illustration of a computer system that may be used in accordance with an embodiment of the invention.

Referring to FIG. 20, a schematic illustration of a computer system that may be used in accordance with an embodiment of the invention. Portions of embodiments are comprised of or controlled by non-transitory machine-readable and machine-executable instructions which reside, for example, in machine-usable media of a computer system 2000. Computer system 2000 may be representative, for example, of photocopier 103, or tablets or smartphones described above. Computer system 2000 is exemplary, and embodiments may operate on or within, or be controlled by a number of different computer systems including general purpose networked computer systems, embedded computer systems, routers, switches, server devices, client devices, various intermediate devices/nodes, stand-alone computer systems, and the like.

Computer 2000 of FIG. 20 includes an address/data bus 2002 for communicating information, and central processor unit 2004 connected to bus for processing information, e.g., instructions, image processing, etc. Computer 2000 also includes data storage features such as computer usable volatile memory 2006, e.g. random access memory (RAM), connected to bus 2002 for storing information and instructions for central processor unit 2004, computer usable non-volatile memory 2008, e.g. read only memory (ROM), connected to bus 2002 for storing static information, e.g., instructions for the central processor unit 2004, and data storage device 2010 (e.g., a magnetic or optical disk and disk drive) connected to bus 2002 for storing information and instructions. Computer 2000 of the present embodiment also includes an optional alphanumeric input device 2012 including alphanumeric and function keys connected to bus 2002 for communicating information and command selections to central processor unit 2004. Computer 2000 also optionally includes an optional cursor control device 2014 connected to bus 2002 for communicating user input information and command selections to central processor unit 2004. Computer 2000 of the present embodiment also includes an optional display device 2016, such as a monitor connected to bus 2002 for displaying, e.g., an indication of authenticity to a user.

The data storage device 2010 may include a non-transitory machine-readable storage medium 2018 on which is stored one or more sets of instructions (e.g. software 2020, which may be a QR code scanning and authentication application stored on a smartphone or tablet) embodying any one or more of the methodologies or operations described herein. Software 2020 may also reside, completely or at least partially, within the computer usable volatile memory 2006, computer usable non-volatile memory 2008, and/or within central processor unit 2004 during execution thereof by computer 2000, the computer usable volatile memory 2006, computer usable non-volatile memory 2008, and/or central processor unit 2004 also constituting non-transitory machine-readable storage media.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An anti-copy optical material, comprising:
   a fluorescent material having a fluorophore configured to absorb a first incident light having an excitation wavelength in a visible spectrum and to emit light having a fluorescent wavelength in the visible spectrum, wherein the visible spectrum has a noise floor, and wherein the emitted light has an intensity below the noise floor; and
   one or more optical absorbers configured to absorb a second incident light having one or more peak wavelengths in the visible spectrum, wherein the second incident light has an intensity above the noise floor of the visible spectrum, and wherein the one or more optical absorbers do not absorb the emitted light having the intensity below the noise floor.

2. The anti-copy optical material of claim 1, wherein the fluorescent material includes a shell surrounding the fluorophore.

3. The anti-copy optical material of claim 2, wherein the shell surrounds a fluorescent dye in solution with a solvent.

4. The anti-copy optical material of claim 2, wherein the shell surrounds at least one of an optically absorptive pigment or an optically absorptive dye.

5. The anti-copy optical material of claim 1, wherein the one or more optical absorbers includes an optically absorptive pigment or an optically absorptive dye.

6. The anti-copy optical material of claim 1, wherein the visible spectrum includes an emission spectrum of a scan lamp, wherein the one or more peak wavelengths include one or more peak wavelengths in the emission spectrum, and wherein the intensity of the emitted light is under the noise floor of the emission spectrum.

7. The anti-copy optical material of claim 6, wherein the excitation wavelength is in a blue color range of the visible spectrum, and wherein the fluorescent wavelength is in a green color range of the visible spectrum.

8. The anti-copy optical material of claim 1, wherein the optical absorbers are configured to absorb more than about 50% of the second incident light having the one or more peak wavelengths.

9. The anti-copy optical material of claim 8, wherein the optical absorbers are configured to absorb at least about 1/e of the second incident light having the one or more peak wavelengths.

10. The anti-copy optical material of claim 1 further comprising a black binding medium.

11. The anti-copy optical material of claim 10, wherein the black binding medium includes a binding medium refractive index and the fluorescent material includes a fluorescent material refractive index, and wherein a difference between the binding medium refractive index and the fluorescent material refractive index is less than 5.

12. A medium optically readable by a machine, comprising:
   a substrate; and
   an anti-copy optical material on the substrate, the anti-copy optical material including:
      a fluorescent material having a fluorophore configured to absorb a first incident light having an excitation wavelength in a visible spectrum and to emit light having a fluorescent wavelength in the visible spectrum, wherein the visible spectrum has a noise floor, and wherein the emitted light has an intensity below the noise floor, and
      one or more optical absorbers configured to absorb a second incident light having one or more peak wavelengths in the visible spectrum, wherein the second incident light has an intensity above the noise floor of the visible spectrum, and wherein the one or more optical absorbers do not absorb the emitted light having the intensity below the noise floor.

13. The medium of claim 12, wherein the fluorescent material includes a shell surrounding the fluorophore.

14. The medium of claim 12 further comprising a barcode on the substrate, wherein the barcode includes at least one of a linear barcode or a matrix barcode.

15. A non-transitory machine-readable medium having instructions which, when executed by a data processing system, causes the data processing system to perform a method comprising:
   directing incident light toward a medium, wherein the incident light includes a first incident light having an excitation wavelength in a visible spectrum and a second incident light having one or more peak wavelengths in the visible spectrum, wherein the medium includes a substrate coupled with an anti-copy optical material, and wherein the anti-copy optical material includes:
      a fluorescent material having a fluorophore configured to absorb the first incident light having the excitation wavelength in the visible spectrum and to emit light having a fluorescent wavelength in the visible spectrum, wherein the visible spectrum has a noise floor, and wherein the emitted light has an intensity below the noise floor, and
      one or more optical absorbers configured to absorb the second incident light having the one or more peak wavelengths in the visible spectrum, wherein the second incident light has an intensity above the noise floor of the visible spectrum, and wherein the one or more optical absorbers do not absorb the emitted light having the intensity below the noise floor;
   receiving returned light from the medium, wherein the returned light includes the emitted light having the fluorescent wavelength; and
   authenticating the medium based on a relative intensity of the returned light having the fluorescent wavelength.

16. The non-transitory machine-readable medium of claim 15 further comprising comparing the relative intensity of the returned light having the fluorescent wavelength to a relative intensity of the returned light having the one or more peak wavelengths.

17. The non-transitory machine-readable medium of claim 16, wherein the medium includes a barcode on the substrate, and wherein authenticating the medium includes validating the barcode based on the relative intensity of the returned light having the emission wavelength being higher than the relative intensity of the returned light having the one or more peak wavelengths.

18. A method comprising:
   generating light from a light source;
   directing the light toward a barcode;
   capturing an image of the barcode while illuminated by the light;
   comparing the captured image to a stored barcode pattern, the stored barcode pattern representing an authentic version of the barcode when the authentic version is illuminated with light from a representative version of the light source; and
   determining that the barcode is authentic when the captured image substantially matches the stored barcode pattern, wherein the stored barcode pattern does not visually match the authentic version of the barcode when the authentic version of the barcode is viewed in ambient lighting; and wherein the light source emits light having a predetermined set of peak wavelengths in a visible spectrum, and wherein the barcode includes a fluorophore configured to be excited by an excitation wavelength different from the predetermined set of peak wavelengths and to emit a fluorescence in the visible spectrum, and wherein the fluorophore alters the captured image such that the captured image does not visually match the authentic version of the barcode when the authentic version is viewed in the ambient lighting.

19. The method of claim 18, wherein the ambient lighting includes sunlight.

20. The method of claim 18, wherein the barcode includes an optical absorber configured to absorb the light having the predetermined set of peak wavelengths in the visible spectrum.

21. The method of claim 18 further comprising displaying, in response to the determining, an indication of authenticity.

22. The method of claim 21, wherein the light source is on a tablet or a smart phone.

23. The method of claim 22, wherein the barcode includes at least one of a linear barcode or a matrix barcode.

* * * * *